(12) United States Patent
Azzarello et al.

(10) Patent No.: US 9,974,295 B2
(45) Date of Patent: *May 22, 2018

(54) PEST CONTROL SYSTEM AND METHOD

(71) Applicants: Marcus Azzarello, New Orleans, LA (US); Joseph Azzarello, Metairie, LA (US)

(72) Inventors: Marcus Azzarello, New Orleans, LA (US); Joseph Azzarello, Metairie, LA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/643,879

(22) Filed: Jul. 7, 2017

(65) Prior Publication Data

US 2017/0303524 A1 Oct. 26, 2017

Related U.S. Application Data

(63) Continuation-in-part of application No. 15/392,708, filed on Dec. 28, 2016, now Pat. No. 9,723,828, which is a continuation-in-part of application No. 15/215,165, filed on Jul. 20, 2016, now Pat. No. 9,723,829, which is a continuation-in-part of application No. 14/274,654, filed on May 9, 2014, now Pat. No. 9,433,201, which is a continuation-in-part of application No. 13/199,344, filed on Aug. 26, 2011, now abandoned.

(51) Int. Cl.
*A01M 1/20* (2006.01)
*A01M 1/02* (2006.01)

(52) U.S. Cl.
CPC .......... *A01M 1/2011* (2013.01); *A01M 1/026* (2013.01); *A01M 2200/011* (2013.01)

(58) Field of Classification Search
CPC .............................. A01M 1/026; A01M 1/2011
See application file for complete search history.

(56) References Cited

U.S. PATENT DOCUMENTS 2,038,495 A 4/1936 Keller
5,592,774 A 1/1997 Galyon
(Continued)

FOREIGN PATENT DOCUMENTS

WO WO2007051873 5/2007

*Primary Examiner* — Christopher P Ellis
(74) *Attorney, Agent, or Firm* — Keaty Law Firm LLC

(57) ABSTRACT

A system and method of monitoring and controlling cellulose-consuming pests in a predetermined location, providing for the use of an assembly that has a main body with a cylindrical upper portion and a lower portion continuously co-axially formed with the upper portion. The lower portion is formed as blades meeting at a lowermost point and defining a sharp bottom point that helps penetrate the soil in the selected location. A plurality of cellulose-containing bait units are detachably fitted in the lower portion and the upper portion. The bait units fitted in the lower portion are retained by the blade portions, which engage radial slots of the bait units. A moisture-retaining member is positioned in the upper portion above an uppermost of the bait units. A removable cap frictionally fittingly engages with the upper portion. The cap has an opening allowing water to be poured into the main body to moisten the bait units and make them more attractive to foraging insects. If consumption of the cellulose material is detected, the bait units may be substituted with a bait material containing poisonous substance. The pests consume the bait and carry the poison to the colonies.

20 Claims, 39 Drawing Sheets

(56) References Cited

U.S. PATENT DOCUMENTS

| | | |
|---|---|---|
| 5,845,843 A | 12/1998 | Kuller |
| 5,877,422 A | 3/1999 | Otomo |
| 6,016,625 A | 1/2000 | Bishoff et al. |
| 6,158,166 A | 12/2000 | Snell et al. |
| 6,401,384 B1 | 6/2002 | Contadini et al. |
| 6,474,015 B1 | 11/2002 | Lund et al. |
| 6,678,995 B1 | 1/2004 | Carviel |
| 6,813,858 B1 | 11/2004 | Wright |
| 6,860,062 B2 | 3/2005 | Spragins |
| 7,212,129 B2 | 5/2007 | Barber et al. |
| 7,937,886 B2 | 5/2011 | Bernard |
| 8,196,342 B2 | 6/2012 | Tolley et al. |
| 2001/0004237 A1 | 6/2001 | Lake et al. |
| 2002/0172658 A1 | 11/2002 | Brode et al. |
| 2002/0178648 A1 | 12/2002 | Frasier |
| 2003/0124166 A1 | 7/2003 | Brode et al. |
| 2005/0190063 A1 | 9/2005 | Lewis |
| 2005/0284017 A1 | 12/2005 | Kongshaug et al. |
| 2006/0117645 A1 | 6/2006 | Cink |
| 2007/0209271 A1 | 9/2007 | Mediate |
| 2007/0256350 A1 | 11/2007 | Cates |
| 2008/0104882 A1 | 5/2008 | Bernard et al. |
| 2009/0031611 A1 | 2/2009 | Traniello |
| 2009/0090045 A1 | 4/2009 | Baker |
| 2009/0300968 A1 | 12/2009 | Zajac et al. |
| 2010/0043276 A1 | 2/2010 | Eger, Jr. et al. |
| 2010/0083556 A1 | 4/2010 | Wright et al. |
| 2011/0041384 A1 | 2/2011 | Willcox et al. |
| 2012/0222346 A1 | 9/2012 | Nichols |
| 2014/0007489 A1 | 1/2014 | Bonacic Kresic |
| 2014/0109463 A1 | 4/2014 | Zajac et al. |
| 2014/0259880 A1 | 9/2014 | Gigliotti et al. |
| 2015/0027033 A1 | 1/2015 | Matsuura et al. |

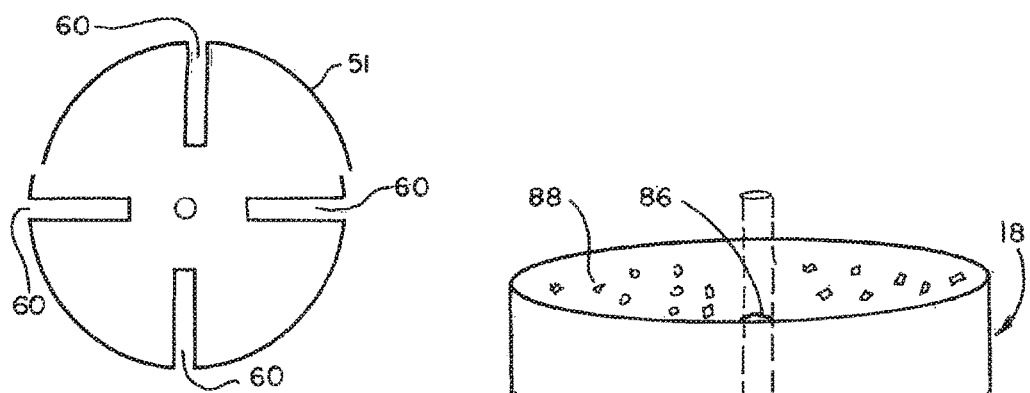
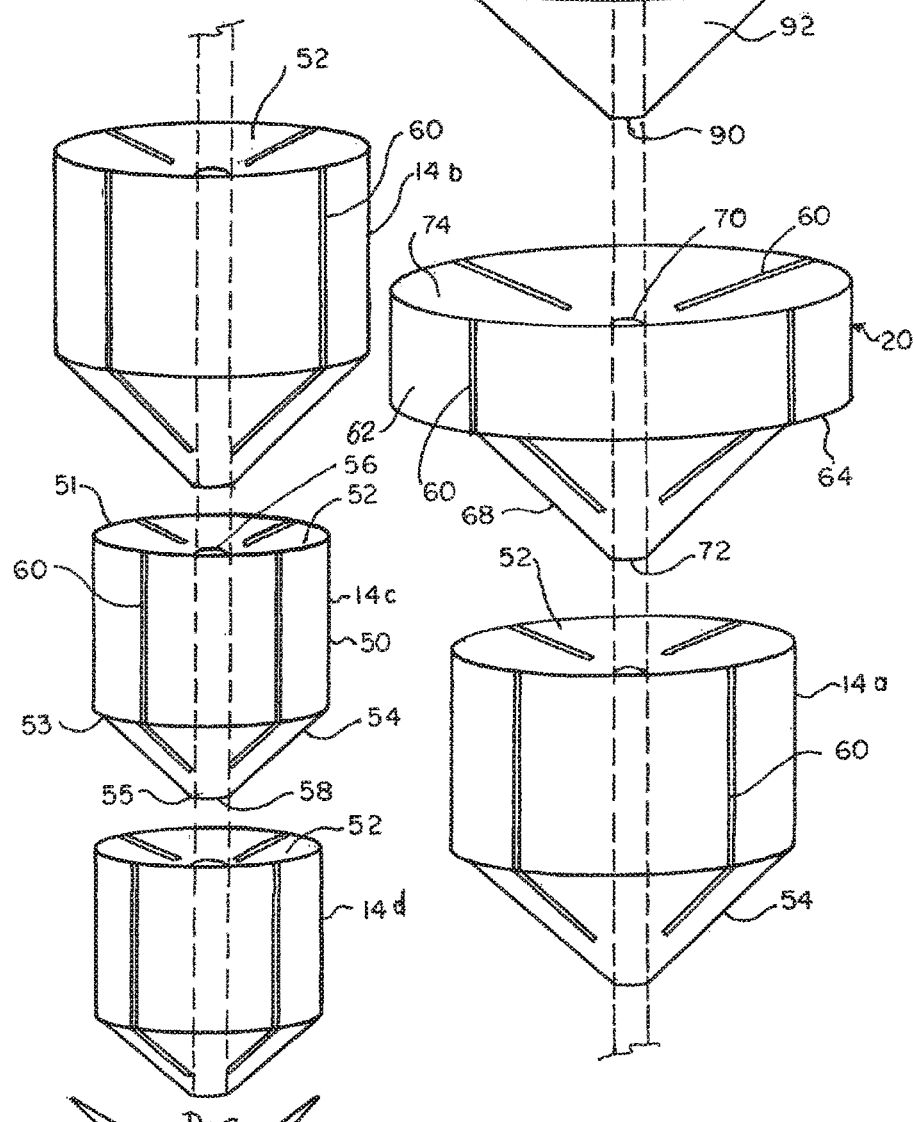
FIG. 4
FIG. 3

PEST CONTROL SYSTEM AND METHOD

CROSS-REFERENCE TO RELATED APPLICATIONS

This application is a continuation-in-part of my application Ser. No. 15/392,708, filed Dec. 28, 2016 for a "Pest Control Above-Ground System and Method," which is a continuation-in-part of my application Ser. No. 15/215,165, filed Jul. 20, 2016 for a "Pest Control System and Method," which is a continuation-in-part of my application Ser. No. 14/274,654, filed May 9, 2014 and issued on Sep. 6, 2016 as U.S. Pat. No. 9,433,201 for a "Pest Control System and Method," which is a continuation-in-part of my application Ser. No. 13/199,344, filed Aug. 8, 2011, now abandoned, the full disclosures of which are incorporated by reference herein and priority of which are hereby claimed.

BACKGROUND

This invention generally relates to a pest control system, and more particularly to a system that allows attraction, interception, elimination, and monitoring of colonies of cellulose-eating pests, such as termites, and other food foraging arthropods with minimal disturbance to the natural foraging of the pests. The system additionally provides for illumination and irrigation along the system, which serves dual purposes of attraction of the pests and aesthetic advantages through appropriate lighting and irrigation as desired by the user. Through the monitoring aspect of the bait station system, data can be collected, analyzed, and appropriately implemented in future operations of the bait station system, which would provide for more effective attraction, interception, and elimination of colonies of cellulose-eating pests in any particular environment.

Many pests, such as termites, are serious threats throughout much of the world to structures or other objects containing wood or other cellulose-containing components because these pests consume cellulose for nutrition. Subterranean termites, which typically dwell in the soil, often form large colonies. Members of the colony forage for food and thus burrow out passageways in the soil outwardly from the nest. Portions of the food located by the foraging termites are returned to the nest. Termites are also known to possess means for communicating the location of a food source to other termites within the colony. Termites invade residential and commercial structures, and even watercraft, moving along, and destroying, wooden or cellulosic poles, studs, beams, and sills.

*Coptotermes formosanus* is an invasive species of termite; it is often nicknamed the super-termite because of its destructive habits. This is due in part to the large size of its colonies, and the termites' ability to consume wood at a rapid rate. A single colony may contain several million individuals (compared with several hundred thousand termites for other subterranean termite species) that forage up to 300 feet (100 m) in soil. A mature Formosan colony can consume as much as 13 ounces (400 g) of wood a day and severely damage a structure in as little as three months. Because of its population size and foraging range, the presence of a colony poses serious threats to nearby structures. Formosan subterranean termites infest a wide variety of structures (including boats and high-rise structures), and can also damage landscaping and trees. In the United States, along with another species, *Coptotermes gestroi*, which has also been introduced from Southeast Asia, the Formosan termites are responsible for tremendous damage to property, resulting in large treatment and repair costs.

Another highly destructive type of termite is *Reticulitermes flavipes*, the eastern subterranean termite, which is the most common termite found in North America. These termites feed on cellulose material like the structural wood in buildings, wooden fixtures, paper, books, and cotton. A mature Formosan termite colony can range from 20,000 workers to as high as 5 million workers, and the queen of the colony lays 5,000 to 10,000 eggs per week. Both *Coptotermes formosanus* and *Reticulitermes flavipes* also feed on cellulose material above ground. In many instances, *Coptotermes formosanus* will build above-ground colonies in the wood they are consuming. These colonies may be associated with above-ground moisture such as rain, outdoor plant material, or moisture leaks in man-made structures. In such cases, the Formosan termites demonstrate a definite preference to feeding and colonizing at grade and above ground. Such termites do not need to return to the ground, and can invade to the top of a several-story structure if given a path of moist wood.

Many pest control systems are known and formed in a wide variety of configurations to monitor and eradicate the pests. One type of popular termite control system, for example, utilizes a monitoring bait food source that is placed below grade; the food source is available to the termites, which begin feeding from the device. The bait incorporates a toxic material, which once consumed, helps in the elimination or suppression of the entire termite colony. However, such systems may be ineffective against the termites that cannot locate the bait.

It has been observed that termites and other pests tend to find a vertical surface, along which they crawl from an underground location in search of food and water. Conventional colony-eradication devices are mostly of cylindrical configuration with smooth exterior walls that may prevent some of the pests from reaching the bait.

The present invention contemplates elimination of drawbacks associated with conventional pest control systems and provision of a pest control system designed to eradicate colonies of cellulose-eating insects inside buildings and structures, while at the same time attracting, intercepting, and monitoring these colonies so as to create more effective eradication of the colonies in future implementations of the pest control system.

SUMMARY OF THE INVENTION

This invention provides a pest-control system and method that is designed to eradicate foraging pests by increasing the likelihood of the foraging termites being attracted to the system and guided into finding the bait. This is due to the unique design that provides for attractants within the system that channels foraging insects to the center of the device, thus directing the insects to consume the bait. Further to the attraction and interception of the foraging termites, monitoring and data collection capabilities are provided, which allow for the replication of preferred environments in future implementations of the pest control system.

It is another object of the invention to provide a pest control system and method of monitoring presence of pests, such as termites, in pre-selected locations.

It is a further object of the invention to provide a system and method that allows retention of moisture on the bait material for a considerable period of time, in the event of a period of less rain fall.

These and other objects of the invention are achieved through a provision of a system and method of monitoring and controlling cellulose-consuming pests in a predetermined location that provides for the use of an assembly that has a main body with a cylindrical upper portion and a lower portion continuously co-axially formed with the upper portion. The lower portion is formed as blades meeting at a lowermost point and defining a sharp bottom point that helps penetrate the soil in the selected location. A plurality of cellulose-containing bait units is detachably fitted in the lower portion and the upper portion, which may act as an attractant to cellulose-consuming pests. The bait units may initially be cellulose-containing to act as an attractant to the cellulose-consuming pests, but alternate units may contain an active ingredient that acts as a poisonous material to the pests, or may contain an ingredient that further serves to control the environment of the system. One such ingredient may be naphthalene, which does not act as a deterrent to cellulose-consuming pests like termites, but does act as a deterrent to different pests like ants. The user may wish to insert such a naphthalene unit if, for instance, the ants have overrun the system to such an extent that it no longer serves as an effective termite bait-and-poison station. The bait units, or alternate units, fitted in the lower portion of the system are retained by the blade portions, which engage radial slots of the bait units. A moisture-retaining member is positioned in the upper portion above an uppermost of the bait units. A removable cap frictionally fittingly engages with the upper portion. The cap has an opening with gasket, allowing water to be poured into the main body to moisten the bait units without disturbing the foraging pests, thus making the bait more attractive to foraging insects. If consumption of the cellulose material is detected, the bait units may be substituted with a unit containing material comprising a poisonous substance. The pests consume the bait and carry the poison to the colonies. This design incorporates below grade, at grade, and above grade cellulose source, thus giving the insect a choice of feeding locations. These alternate sources and added attractant features of the system increase the chance of the insect actually finding and consuming the bait food source.

BRIEF DESCRIPTION OF DRAWINGS

Reference will now be made to the drawings, wherein like parts are designated by like numerals, and wherein:

FIG. 3 is an exploded view of the bait units and a moisture retaining unit;

FIG. 4 is a top view of the bait units;

DETAILED DESCRIPTION OF THE INVENTION

Figure 1:
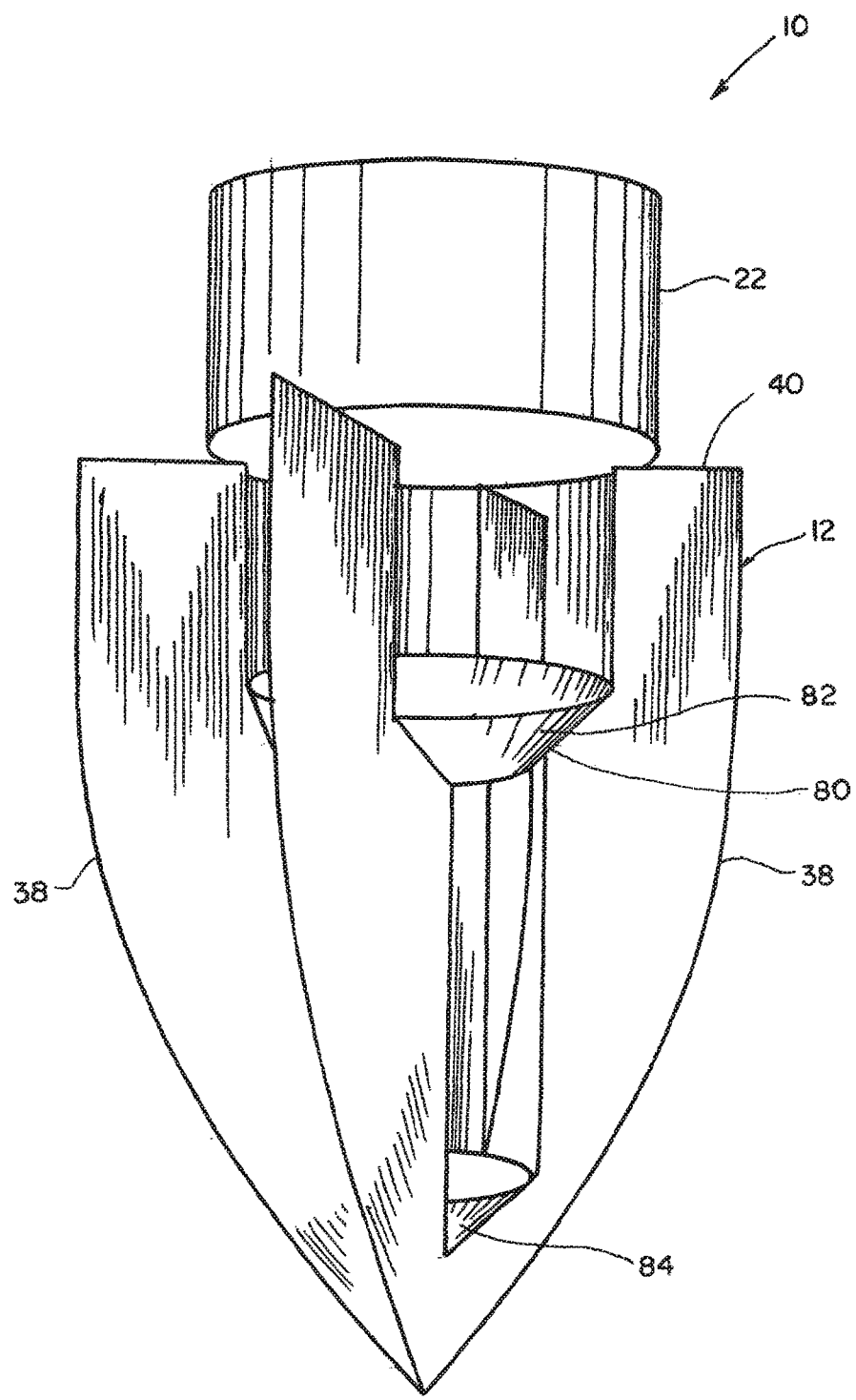
FIG. 1 is a perspective view of the pest control assembly according to the first embodiment of the present invention.

Turning now to the drawings in more detail, numeral 10 designates the pest control assembly according to the first embodiment of the present invention. The assembly 10 comprises a main body 12, a plurality of axially aligned bait units 14 detachably engageable with the main body 12, a removable cap 16 fitted over the top of the main body 12, and a moisture retaining member 18 detachably mounted in the main body 12 between the uppermost bait unit 20 and the cap 16.

The main body 12 comprises an upper hollow cylindrical portion 22 and a lower co-axially extending portion 24. The upper portion 22 has a top open end defined by an upper edge 28. A plurality of fin-shaped blades 30 defines the lower portion 24. Each of the blades 30 can be configured as an inverted triangle, with a sharp point 32 facing downwardly. Each blade 30 comprises a smooth planar narrow body of generally triangular configuration, although the bottom part 31 can be formed arcuate, as illustrated in the drawings.

Figure 8:
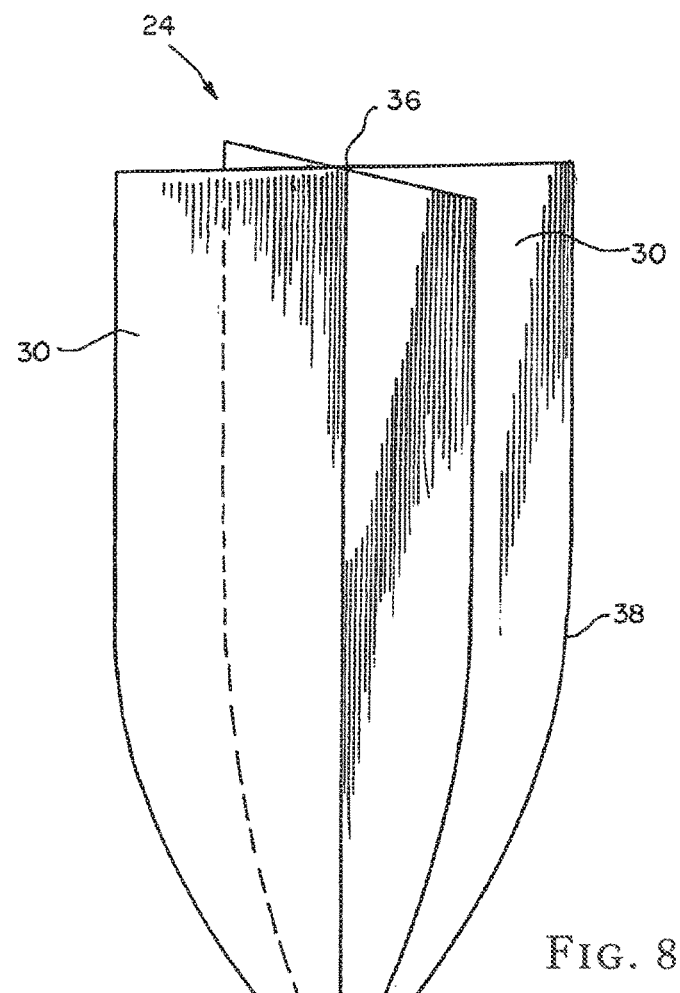
FIG. 8 is a plan view of a tool used to prepare an appropriate implementation area for certain embodiments of the pest control system.
Figure 9:
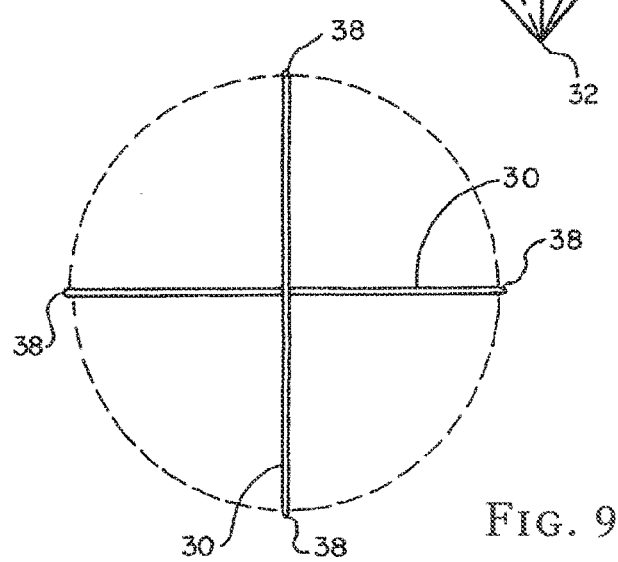
FIG. 9 is a top view of the tool used to prepare an appropriate implementation area for certain embodiments of the pest control system.

Each blade 30 has an inner edge 36 and an outer edge 38. The blades 30 can intersect and be joined at their inner edges 36, as shown in an exemplary embodiment of FIGS. 8 and 9. The blades can be three or more in number, equidistantly spaced about the circumference of the main body 12.

The upper portion 22 and the lower portion 24 can be unitary formed from a single sheet of rigid sturdy material, such as metal or plastics. The upper portion 24 can be rigidly affixed to an upper edge 40 of each blade 30. Alternatively, the upper portion 22 can be detachably engageable with the lower portion 24. An inwardly extending horizontal shoulder 42 is formed between an inner surface 23 of the upper portion 22 and an inner part of the blades 30. The shoulder 42 supports at least one of the bait units 14, as will be explained in more detail hereinafter.

The main body 12 is configured to carry a plurality of bait units 14, which can be of the same size or of different sizes. In one of the preferred embodiments, the bait units 14 have a hollow substantially cylindrical central body portion 50, an upper plate 52 extending over the top of the central body portion 50, and a lower part 54 secured to the bottom of the central body portion 50. The upper plate 52 has an inverted cone configuration having a central opening 56 communicating with the hollow interior of the central body portion 50. The upper plate 52 has its widest part secured to the top edge 51 of the central body portion 50, while the apex of the plate 52 extends downwardly into the central body portion 50.

The lower part 54 has an inverted cone configuration with its widest part secured to the bottom edge 53 of the central body portion 50. An apex 55 of the lower part 54 is provided with a central opening 58, which is co-axially aligned with the opening 56 in the upper plate 52.

A plurality of radial slots 60 extend from the upper plate 52, along the cylindrical wall of the central body portion 50 and continue to the lower part 54. The slots 60 are configured to receive the blades 30 of the main body 12 when the bait units 20, 14a-14d are fitted within the main body 12. The bait units 20, 14a-14d are formed from cellulose-containing substance, which is particularly attractive to subterranean and above-ground foraging pests. The bait units can be formed as unitary bodies from pressed cellulose-containing substance.

The uppermost bait unit 20 has an enlarged central body portion 62, which forms a horizontal inwardly extending shoulder 64, which connects with the lower conical part 68. The shoulder 64 is configured to rest on the horizontal shoulder 42 of the blades 30. Similarly to the bait units 14a-14d, the uppermost bait unit 20 is provided with aligned openings 70, 72 formed in an upper conical plate 74 and the lower conical part 68, respectively.

Figure 2:
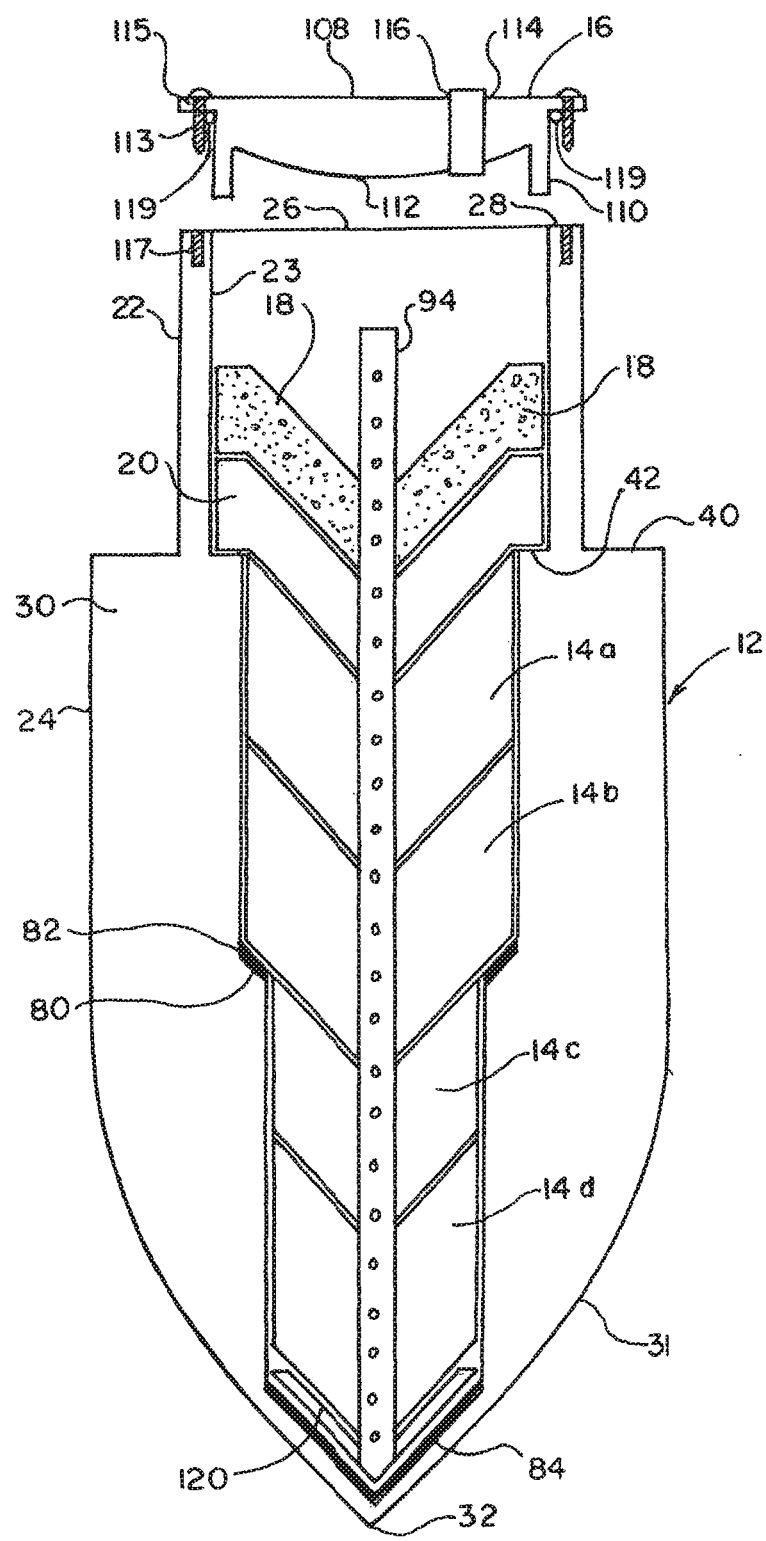
FIG. 2 is a sectional, partially exploded view of the pest control assembly of the first embodiment.

As can be seen in FIG. 2, the bait units 14a and 14b are slightly larger in diameter than the bait units 14c and 14d. An inclined shoulder 80 is formed between the bottom sharp point 32 of the blades 30 and the horizontal shoulder 42. A first soil displacement member 82 is fitted on the main body 12 to fit between the blades 30 and rest on the inclined shoulder 80. A second soil displacement member 84 is fitted on the main body 12 below the bait unit 14d.

Each of the first soil displacement member 82 and the second soil displacement member 84 is formed as a hollow member of inverted-cone configuration, with its apex facing downwardly. The first and the second soil displacement members 82, 84 are formed from a relatively rigid material, which protects the lower portions of the bait units from being crushed as the assembly 10 is driven into the ground.

The moisture-retaining member 18 can be formed to match the configuration of the uppermost bait unit 20 and fit within the upper portion 22 of the main body 12. The moisture-retaining member 18 is positioned above the uppermost bait unit 20. The moisture-retaining member 18 can be formed from an open-cell foam material, such as sponge. The moisture-retaining member 18 is formed with an opening 86 in its upper cone 88 and an aligned opening 90 in the lower cone 92.

The bait units 14 are stacked vertically on the blades 30, above the second cone 84. The lower bait units can be one or more in number, and may composed of cellulose-containing bait material, or may alternatively be composed of active-ingredient poisonous material or alternative material that further serves to control the environment of the system. Additional bait units, which may be comprised of bait, active-ingredient, or alternative material, are stacked vertically above the first soil displacement member 82, and can be also one or more in number. The bait units are vertically aligned with the earth-displacing first and second soil displacement members 82, 84 such that the openings in the bait units define a central passageway for a riser tube 94. The lower part of each subsequent bait unit fits an upper plate of the bait unit below with the conical parts having a matching angle to allow stacking. The upper plate 52 of the lowermost bait unit is configured to receive a matching angle lower conical part 54 of the bait unit positioned above it. The stacking of the bait units is completed with the uppermost bait unit 20, which frictionally receives the moisture-retaining member 18 within its upper cone plate 88.

The riser tube 94 is inserted through the aligned openings 86, 90, 70, 72, 56 and 58. The riser tube 84 extends from the second cone 84 to a distance above the moisture-retaining member 18. In one aspect of the invention, the riser tube 94 extends within the upper portion 22 of the main body 12.

Figure 6:
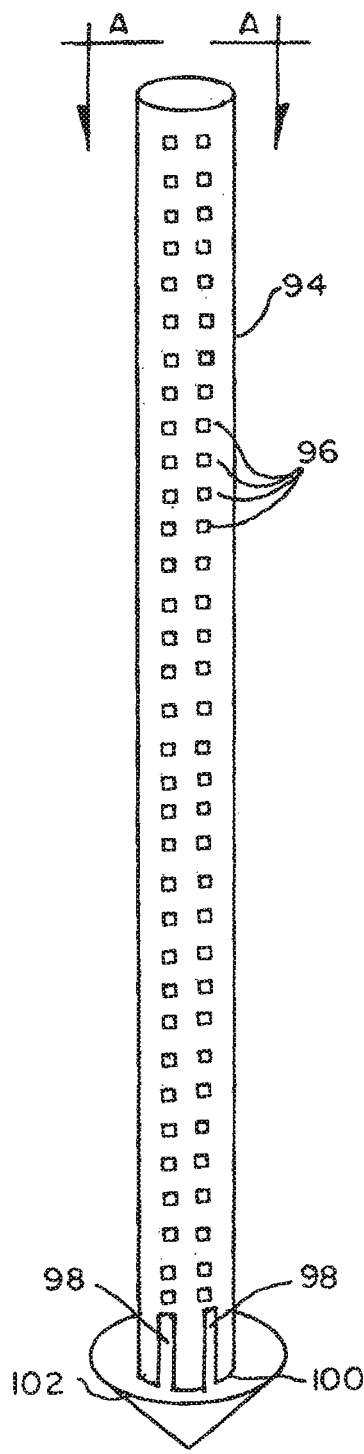
FIG. 6 is a detail perspective view of a perforated riser and a moisture collector secured on the bottom of the riser.
Figure 7:
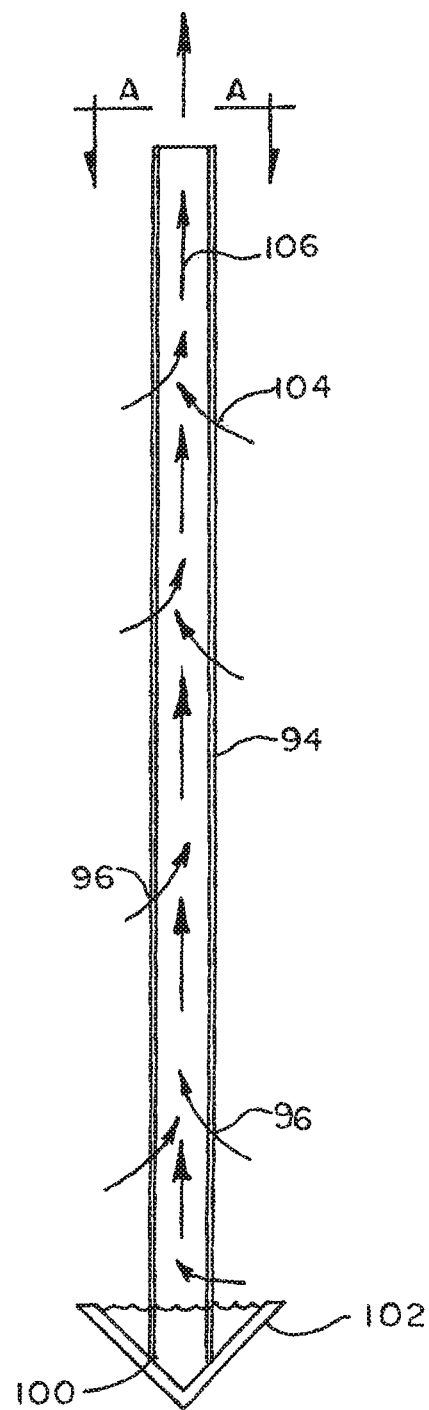
FIG. 7 is a side view of the riser illustrating evaporation and condensation effect employed in the pest control system of the present invention.

Turning now to FIGS. 6 and 7, the riser tube 94 is illustrated in more detail. The riser tube 94 extends along a longitudinal axis of the main body 12. The riser tube 94 comprises an elongated tubular body having a plurality of perforations 96 formed along the sidewall thereof. A bottom of the riser tube 94 is provided with longitudinal slots 98 extending from the bottom edge 100 of the riser tube 94 a distance upwardly. The bottom edge 100 of the riser tube 94 rests on a conical moisture collector 102, which frictionally fits in the second cone 84. In one aspect of the invention, the exterior surface of the conical reservoir matches the interior surface of the second cone 84, allowing a stable positioning of the moisture collector 102 within the second cone 84.

The riser tube 94 allows circulation of moisture to the bait unit so that they are kept moist to attract the termites. The moisture penetrates through the openings 96 and rises through the riser tube interior, as schematically shown by arrows 104 and 106 in FIG. 7. Some of the moisture is collected in the inverted cone of the moisture collector 102. It is envisioned that the moisture collector 102 can also receive some of the cellulose material of the bait units should the material become loose.

The cap 16 removably fits over the upper portion 22 of the main body 12. The cap 16 comprises a flat planar top 108, a cylindrical sidewall 110, and an outwardly convex bottom surface 112. The diameter of the planar top 108 is at least slightly greater than the diameter of the sidewall 110, and a circumferential flange 109 is formed between an edge 111 of the planar top 108 and the exterior of the sidewall 110. The circumferential flange 109 allows the user to lift and remove the cap 16 for inspecting conditions of the bait units in the assembly 10. The cap 16 may also allow for a means of securing or sealing the cap 16 to the main body 12. One preferred embodiment allows for securing the cap 16 to the main body 12 by providing fastener ports 115, 117. The upper fastener port 115 is located on a circumferential flange 109 distally from the sidewall 110 and extends through the portion of top surface 108 that forms the circumferential flange 109 to the bottom of the circumferential flange 109 which contacts the upper edge 28 of the main body 12. The lower fastener port 117 aligns with the upper fastener port 115 and is a hole that extends a length slightly longer than the fastener 113. The fastener should have a length slightly shorter than the combined lengths of the upper and lower fastener ports 115, 117. Once the cap 16 is placed over the main body 12, the fastener 113 is placed through the upper fastener port 115 and continues into the lower fastener port 117 to secure the cap 16 to the main body 12. To ensure a sealing engagement of the cap 16 with the main body 12, an O-ring 119 is fitted to the underside of the circumferential flange 109. The O-ring 119 presses against the exterior of the sidewall 110.

The outside diameter of the sidewall 110 is at least slightly smaller than an inner diameter of the upper portion 22 of the main body 12 such that the sidewall 110 of the cap 16 frictionally tightly fits inside the upper portion 22. A port 114 is formed in the cap 16 extending from the top surface 108 to the bottom surface 112 of the cap. A short tube 116 may be inserted in the port 114. The port 114 serves as an inlet for water to be added to the bait units and allows optional collection of data about the physical conditions inside the assembly 10, such as dew point, humidity, and temperature.

Figure 19:
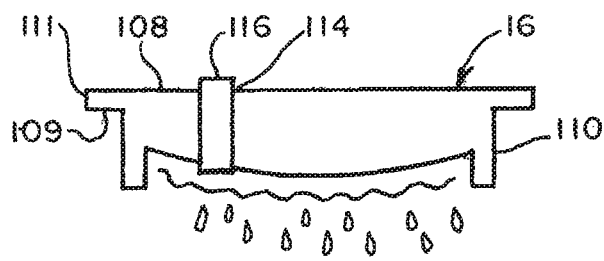
FIG. 19 illustrates condensation of water on the cap of the assembly of this invention.

As can be seen in FIG. 19, the outwardly convex bottom surface 112 of the cap 16 helps to direct water rising through the riser tube 94 toward the center of the main body 12, where the riser tube 94 extends. The moisture is re-circulated back into the bait units 14 to keep them from becoming dry.

Figure 13:
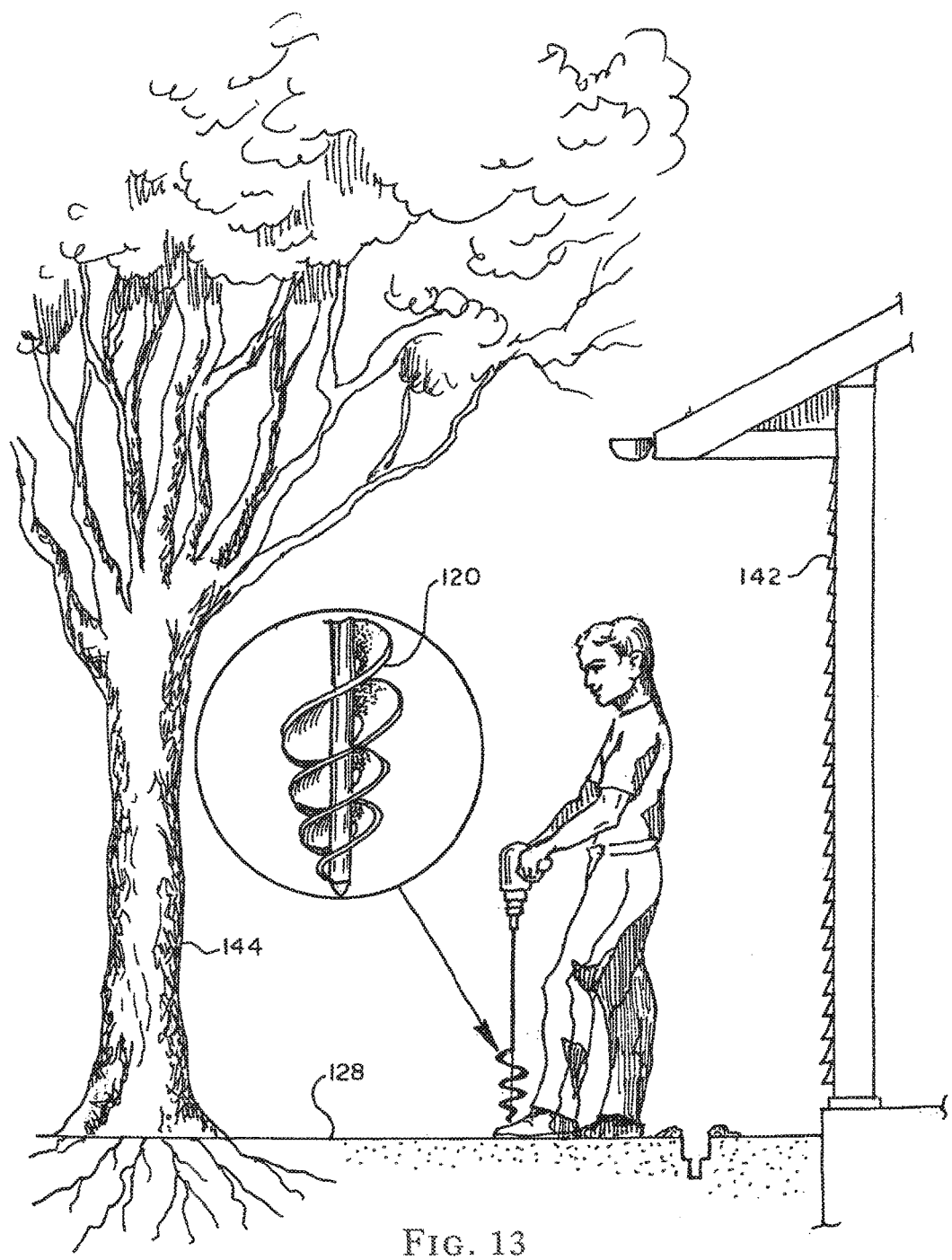
FIG. 13 illustrates a user preparing a hole in the ground for receiving the pest control assembly of the present invention.

To place the assembly 10 in the soil, the user creates a hole using any available equipment, such as an auger, shown in FIG. 13. The auger 120 is a two-stage auger having smaller helical blades on the bottom and larger helical blades above. The soil auger 120 is capable of forming a two-stage hole 122 in the soil, with a smaller diameter hole 124 in the bottom and a larger diameter hole 126 above. The hole 122 is configured to receive the assembly 10, allowing the sharp ends 32 of the blades 30 to lead the assembly into the hole.

Figure 14:
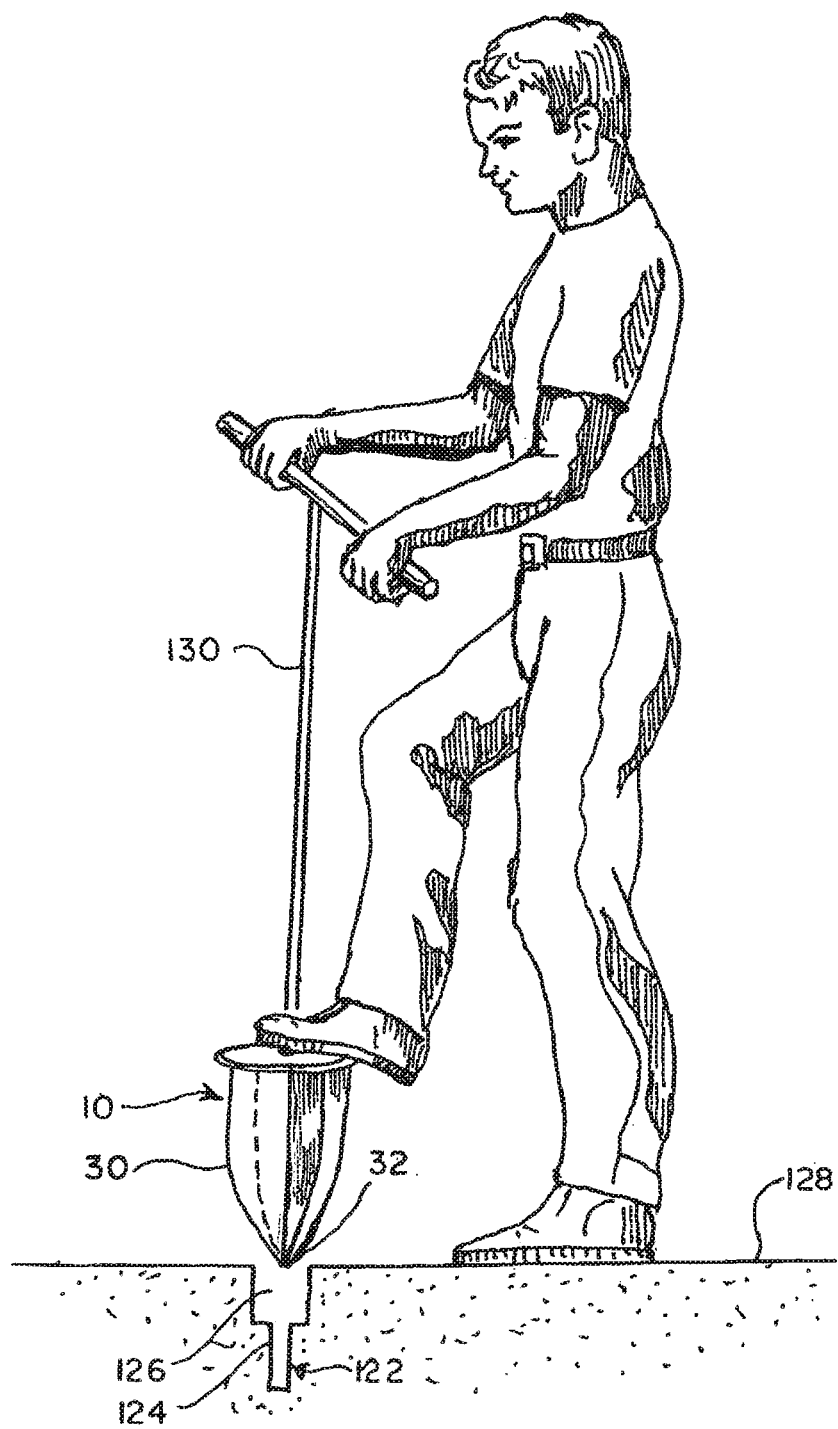
FIG. 14 illustrates a user positioning the pest control assembly in the prepared hole.
Figure 15:
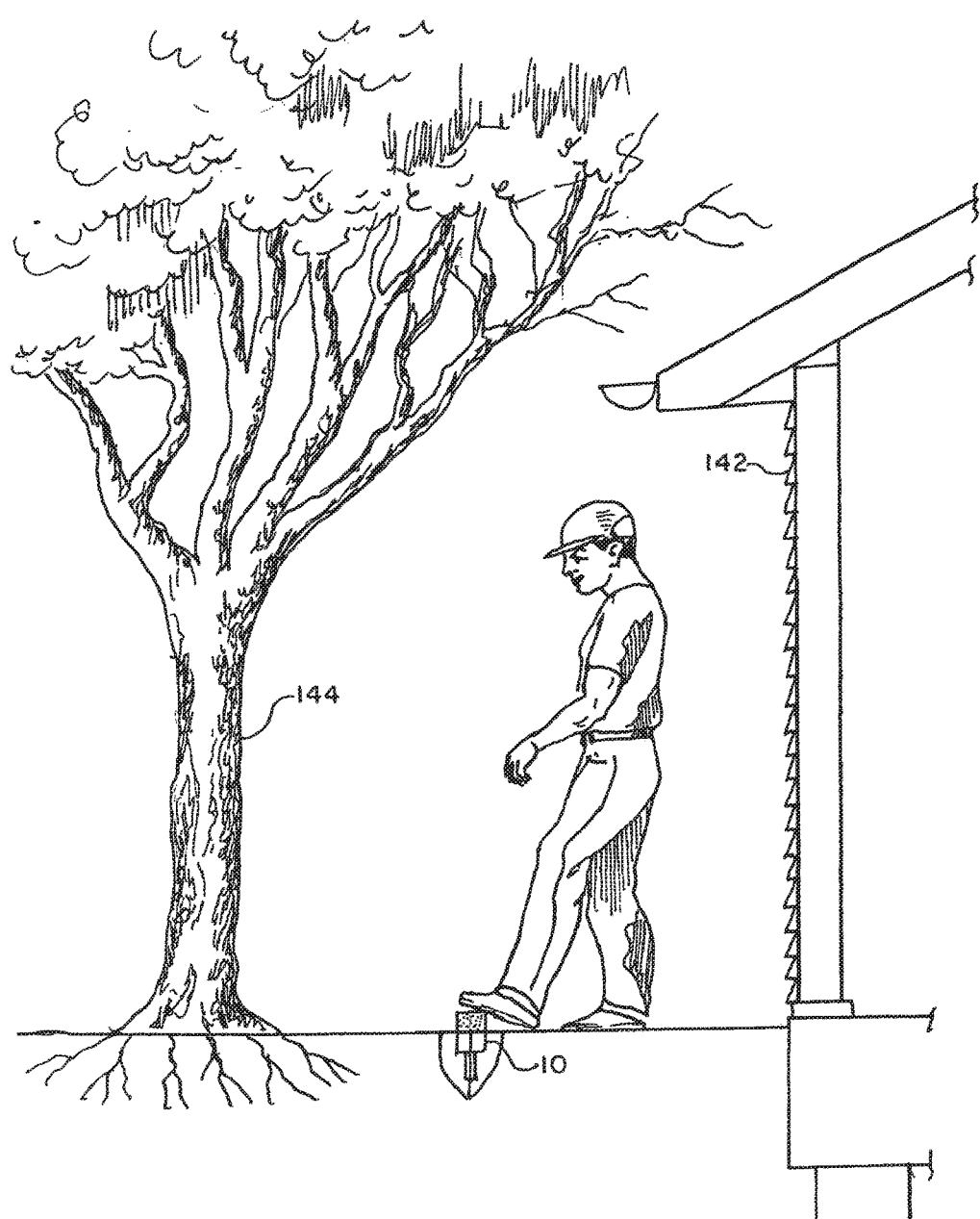
FIG. 15 illustrates the user positioning the pest control assembly in the soil and applying downward force for embedding the pest control assembly in the formed hole.

In operation, the main body 12 with the first and second soil displacement members 82, 84 is placed directly in the prepared hole 122 in a location where the presence of pests is detected or suspected. It is preferred that the soil has moisture content greater than 5% in the selected location. The user ensures that the blades 30 are embedded into the soil 128 such that the lower portion 24 of the body 12 is below ground, while the upper portion 22 may extend above ground. If necessary, the user applies a downward force with a hand tool 130, as shown in FIG. 14. Alternatively, the user can force the main body 12 into the hole 122 using his hands or foot, as shown in FIG. 15.

The blades 30 secure the assembly 10 in the ground, minimizing the chance of assembly displacement. The user then places cellulose-containing bait units 14a in engagement with the main body 12. The moisture-retaining member 18 made of sponge material is placed above the uppermost bait unit 20, and the riser tube 94 is inserted through the aligned openings in the moisture-retaining member 18 and the bait units 14. The cap 16 is positioned on top of the upper portion 22, and water is added to the bait units to moisten the cellulose material.

Figure 16:
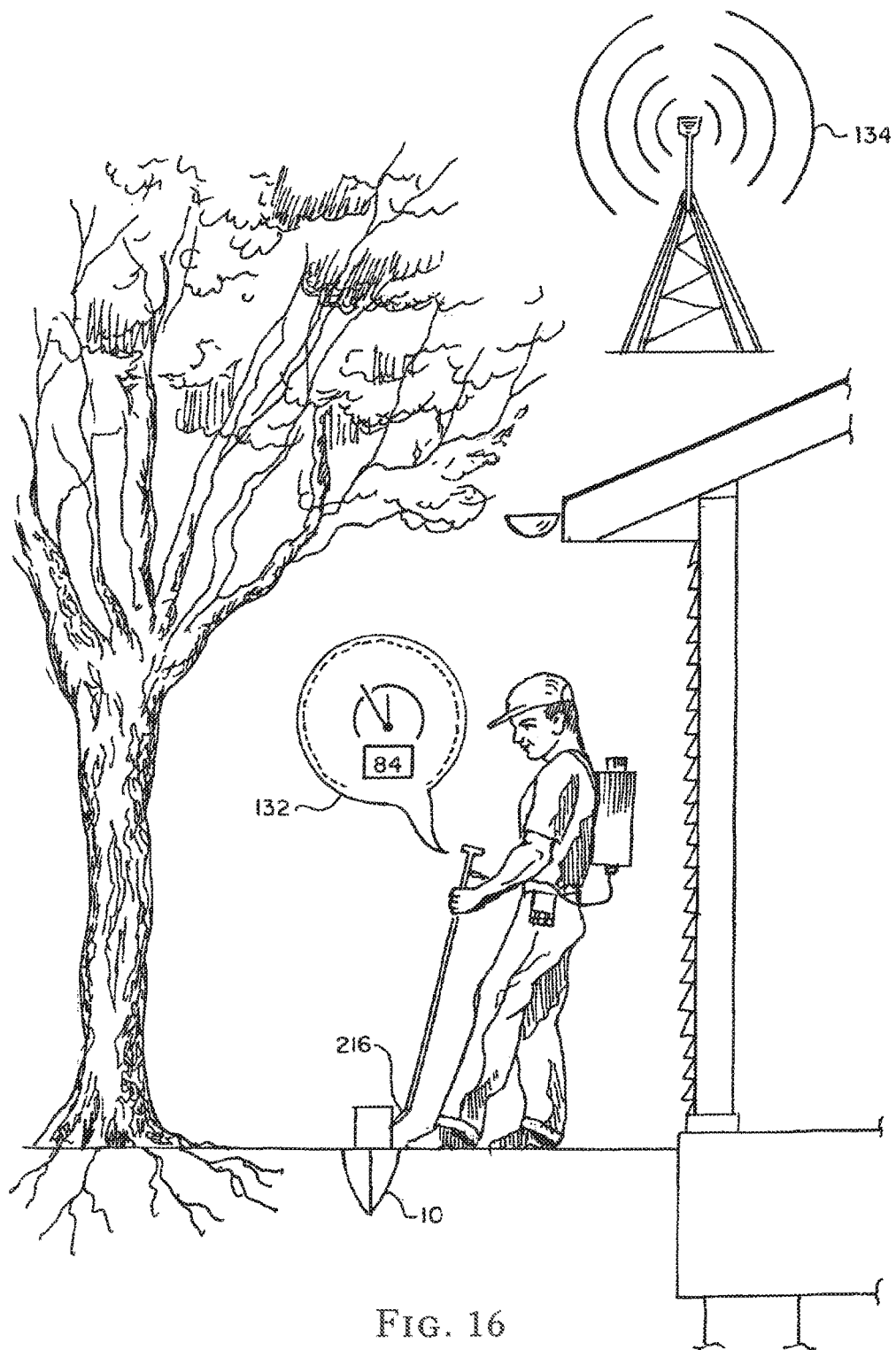
FIG. 16 illustrates inspection of the bait station formed by the pest control system of the present invention and data collection.

In one aspect of the invention, it is preferred that the cellulose-containing bait units 30 remain undisturbed for a period of about 30 days to give the foraging pests a chance to locate and feed on the cellulose. From time-to-time, the user may inspect the bait stations formed by the assembly 10. As is schematically illustrated in FIG. 16, the user may use a sensor 132 to check the conditions in the assembly 10.

The collected data can be wirelessly sent via a wireless transmitter 134 to a remote location, for instance a monitoring company.

Figure 17:
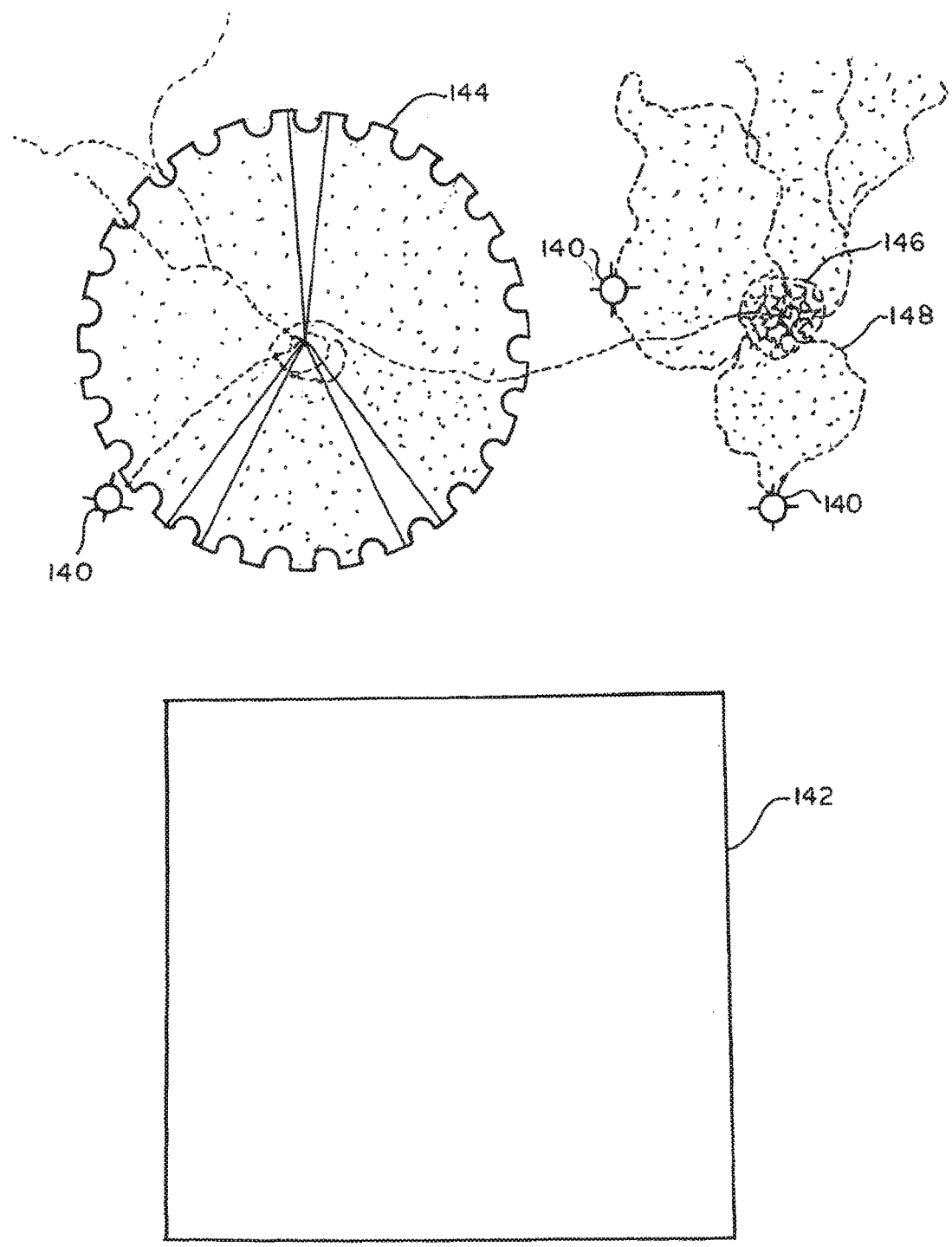
FIG. 17 illustrates location of the bait stations of the present invention relative to a building structure.

FIG. 17 illustrates possible locations of the bait stations 140 adjacent a building 142. The property may have a tree 144 adjacent the building 142. The tree naturally attracts termites. A termite colony 146 may exist on the property. Phantom lines 148 illustrate movement of termites from the colony 146 to the tree. The location of the bait stations 140 is selected to be near the building 142 and the tree(s) 144.

Figure 18:
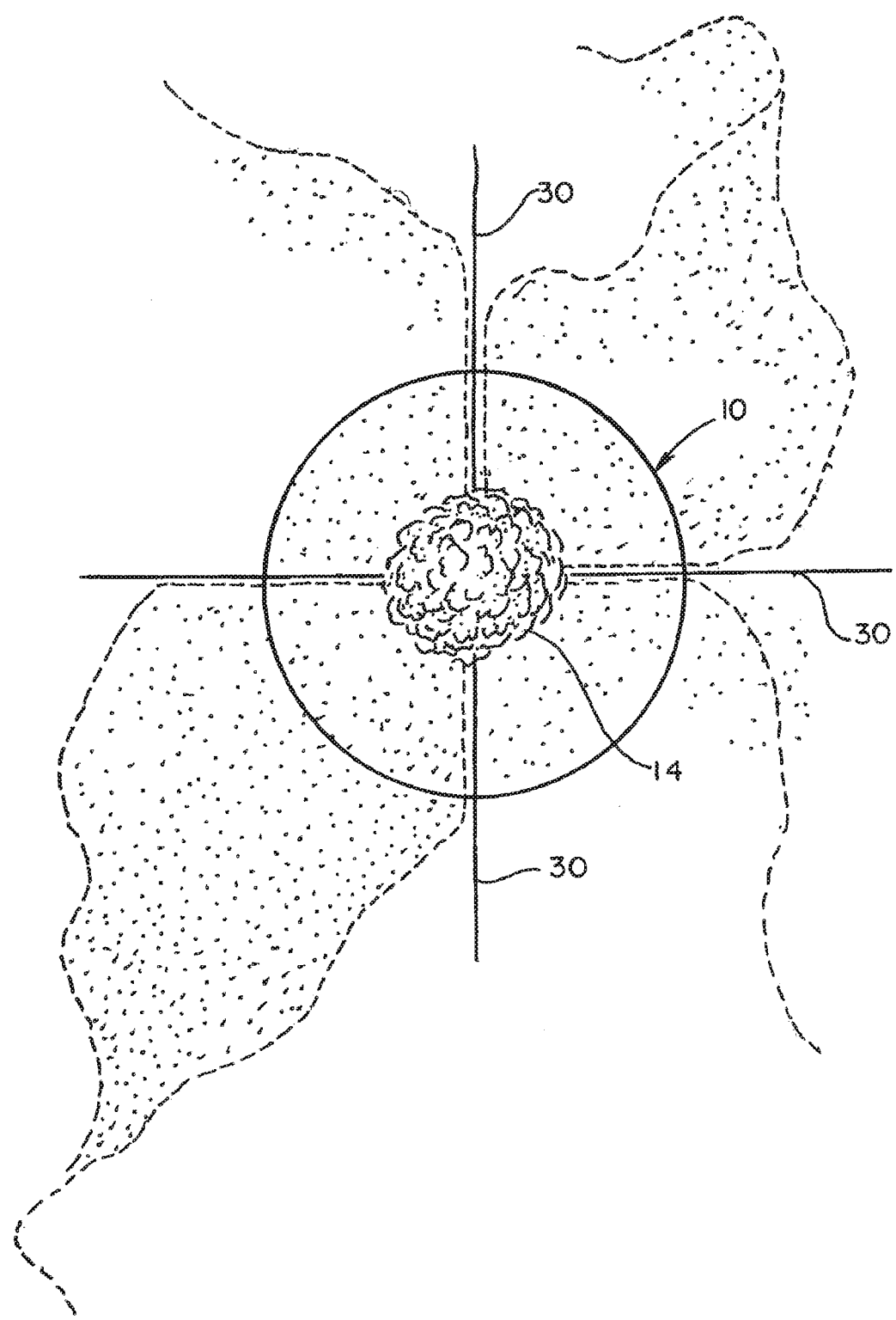
FIG. 18 illustrates pathways formed by directional wings which direct pests attracted to the pest control system of the present invention.
Figure 20:
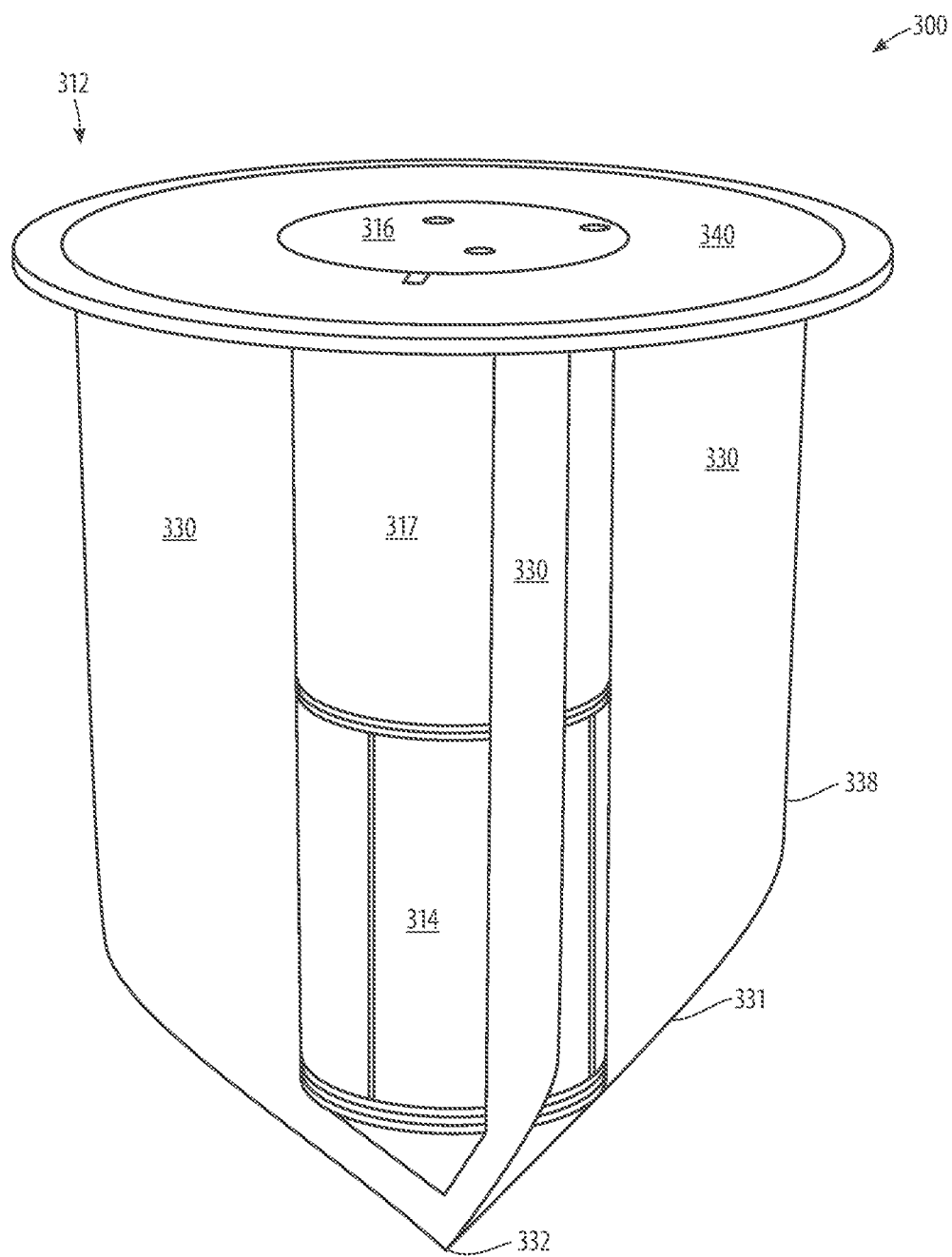
FIG. 20 illustrates an embodiment of the pest control system and method of the invention having interchangeable modules.

FIG. 18 illustrates the termites following the runways and using the blades 30 of the assembly 10 as a guiding path to the center of the cellulose bait units 14. The blades 30 form the vertical walls, which direct the termites and allow then to gain access to the bait units 14.

On occasion, the user inspects the bait stations 140 to ascertain whether the bait units 14 have attracted above-ground and/or subterranean termites, or have otherwise affected the natural environment of the station. After the feeding has begun, poisonous termite bait with active ingredients is added to the assembly 10. If the system 10 is used only for the purpose of monitoring the subterranean activity and detecting the presence of termites, no toxic bait need to be added. If the user detects no activity in the system 10, the body 12 can be relocated to a new site. It is envisioned that the body 12 may also need to be relocated should the user detect presence of non-targeted insects, such as arthropods, annelids, or mollusks.

Once the active-ingredient bait has been placed in the main body 12, the termites feeding on the bait bring the bait to the colonies. As the toxic substance is consumed by termites, the bait with the cellulose substance is added to the interior space 20 for period of time for the bait to have the intended toxic effect on the colony. The system 10 is periodically inspected to determine whether termites are active within the system 10.

Depending on the activity and the speed of consumption of the cellulose-containing material and the bait, larger or smaller system 10 can be substituted in the selected location. If the cellulose-containing material is consumed within a matter of days, a larger body 12 may be needed to hold larger quantity of cellulose-containing substance. The size of the body 12 can range from just a few inches in height and diameter to several feet in diameter. The large unit would be used possibly under a structure where the termite foraging pressure is very high and the colony size and age is greater than average, and thus a larger quantity on cellulose would be needed to last 30 days. It is envisioned that the interval to be used as bait replacement period can be set by the pesticide regulatory bodies at 30 to 90 days.

One of the advantages of the system of the present invention is that it most closely mimics the way cellulose is found and consumed by subterranean termites under natural environmental conditions. The cellulose-containing material can be chips of wood, carton, paper, and so forth, placed directly on the ground surface, below and above grade, thus attracting surface-foraging pests. The toxicant in the bait is preferably of the delayed-action type, or an insect growth regulator, pathogen, or metabolic inhibitor. Preferably, it comprises a nontoxic cellulose-containing bait composition to which the pesticide toxicant is added. The removal, inspection, and/or replacement of the cap 16 does not substantially disturb the network of access passageways established between the termite colony or nest and the system 10 because the body 12 is not displaced during removal and substitution of the cellulose-containing substance with the toxic bait. Similarly, the removal, inspection, and/or replacement of the bait units 14 does not substantially disturb the network of access passageways, because the user of the system may easily remove and replace the appropriate bait units 14, which may be comprised of cellulose, active-ingredient, or other appropriate material, quickly and without altering the overall installation of the system. The easy removal, inspection, and/or replacement of these individual bait units 14, which minimizes disturbance of the overall system, allows for the user to potentially alter the cellulose or poison content of the system by, for example, replacing a cellulose bait unit with an active-ingredient bait unit when the termites are foraging, or by replacing an active-ingredient bait unit with a cellulose bait unit when the user wishes to attract more termites to the station.

Figure 5:
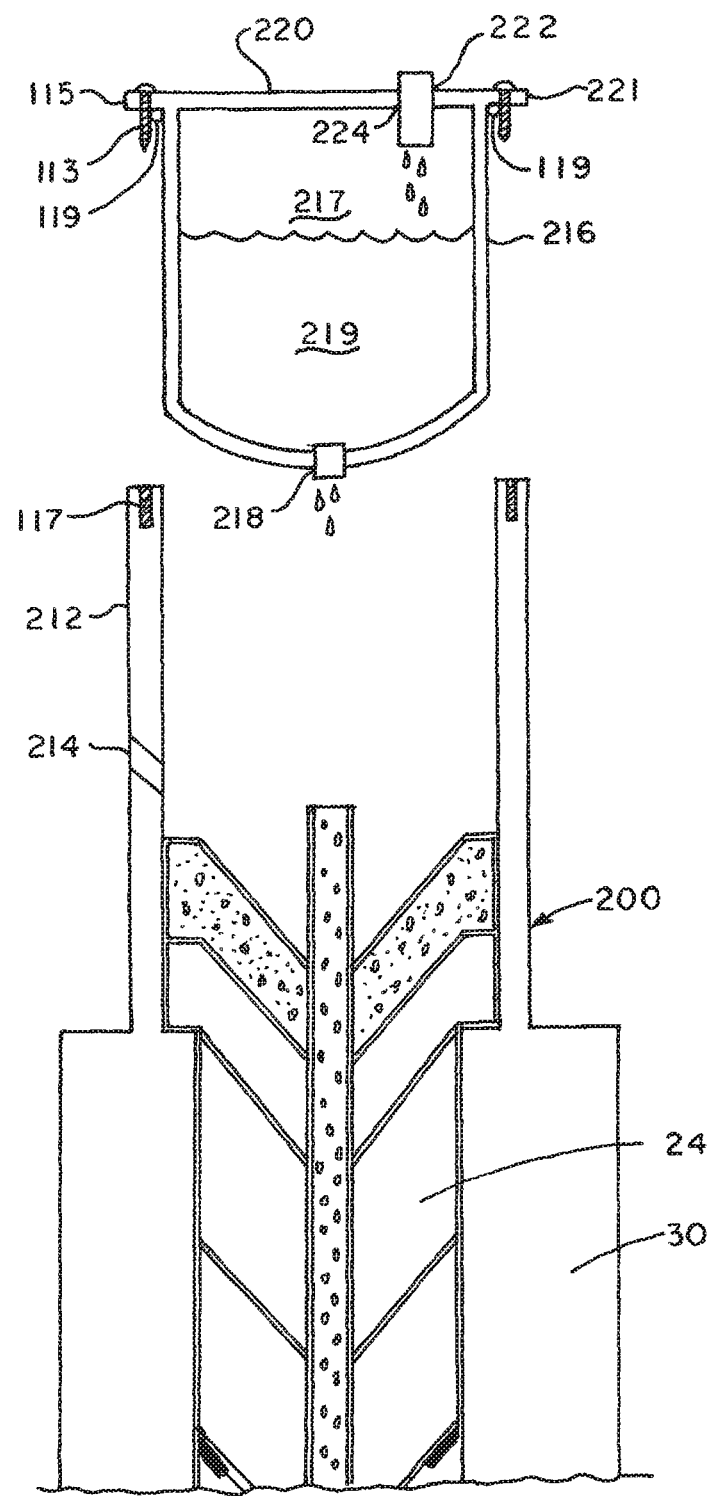
FIG. 5 is a sectional view of the second embodiment of the pest control assembly according to the present invention.

Turning now to the second embodiment of the present invention, illustrated in FIG. 5, the upper portion 212 of the main body is shown to be provided with an opening 214 formed at an angle to a longitudinal axis of the upper portion 212. The opening 214 can be used for collection of data and introduction of a sensor 216 (schematically shown in FIG. 16) into the main body 200.

In this embodiment of the invention, the cap 216 forms a reservoir 217 for retaining a pre-determined amount of water 219, which is gradually and slowly dispensed through a bottom opening 218. The top plate 220 of the cap 216 is provided with an inlet opening, similar to the opening 114, through which water supply in the reservoir 217 can be admitted. A short conduit 222 is inserted in the inlet port 224 to guide liquid into the main body 200 of the pest control assembly.

Similarly to the cap 16, the cap 216 has an outwardly extending circumferential flange 221, which allows the user to remove the cap 216 and inspect the conditions of the bait units of the pest control assembly. Other features of the cap 216 and the pest control assembly are similar to the first embodiment, where the lower portion is used to retain a plurality of bait units 14 and the moisture retaining sponge 18. It is envisioned that this embodiment can be particularly advantageous in arid climates.

Figure 10:
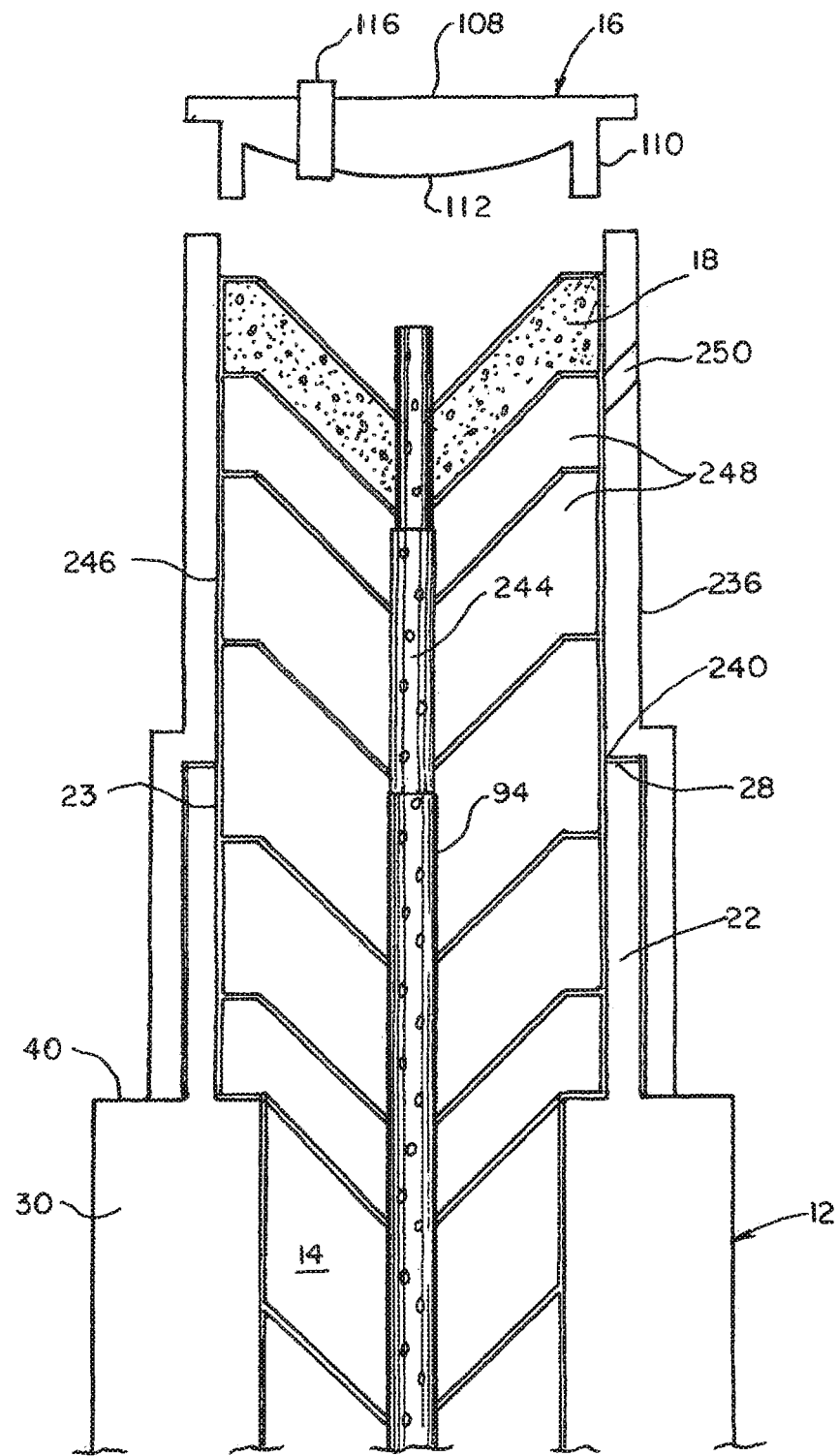
FIG. 10 is a detail sectional view of the third embodiment of the pest control assembly according to this invention.
Figure 11:
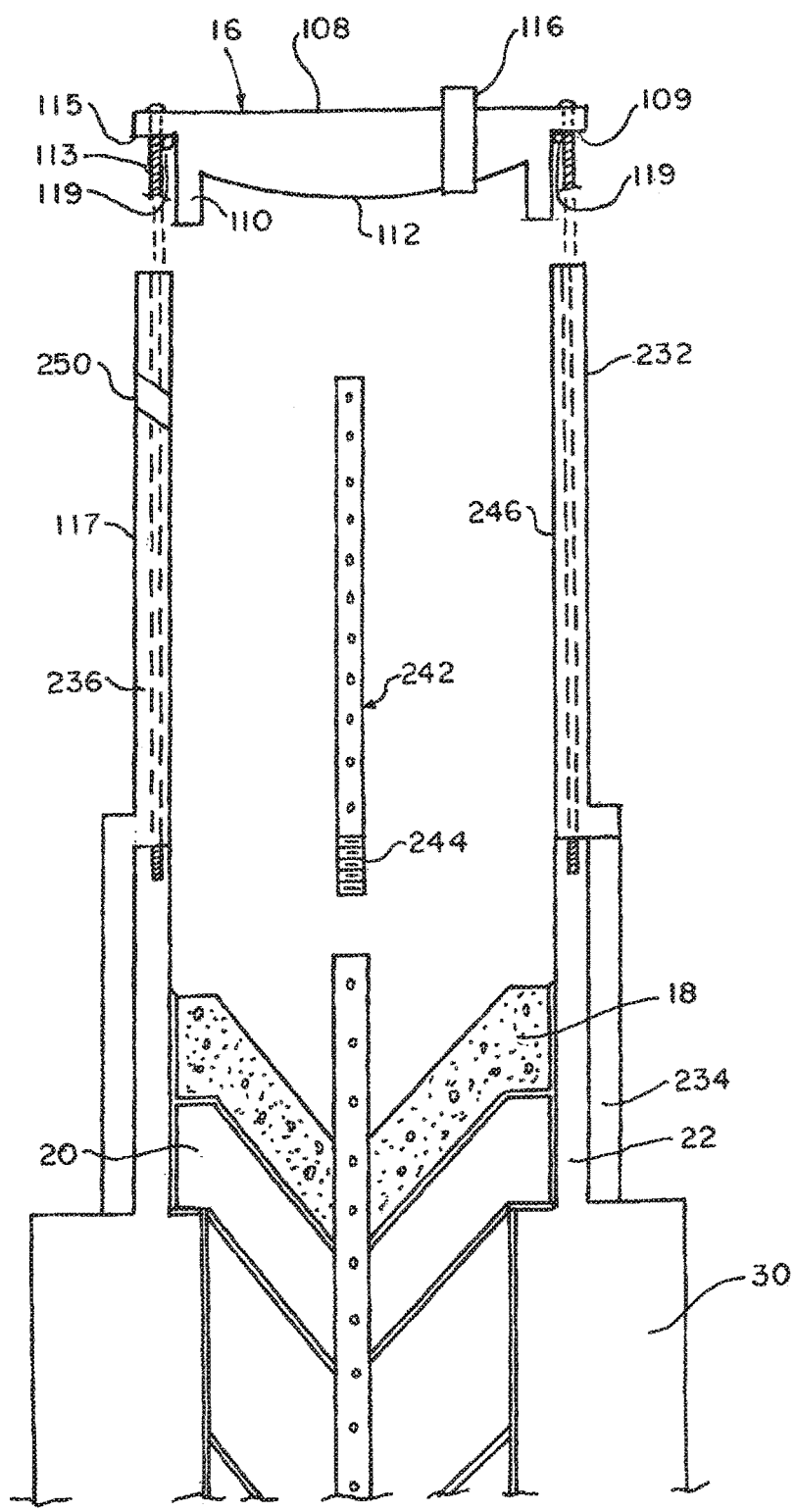
FIG. 11 is detail sectional view of the third embodiment showing an extension riser.
Figure 12:
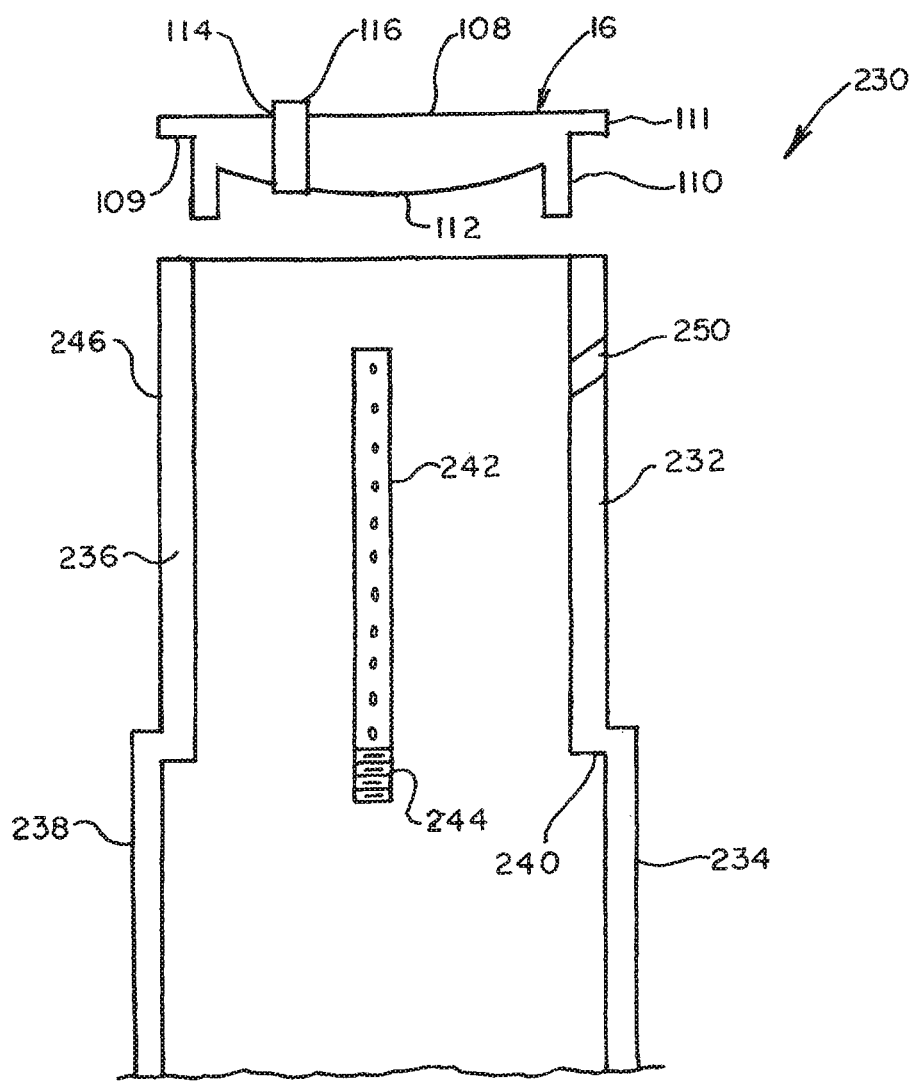
FIG. 12 is detail view of an extension member of the third embodiment of the present invention.

FIGS. 10-12 illustrate a third embodiment of the system of the present invention. In this embodiment, a detachable extension member 230 is added to the upper portion 22 of the main body 12. The extension member 230 comprises a hollow tubular element 232, which has a bottom part 234 and a top part 236. The tubular element 232 has an inner wall 238 provided with an inwardly horizontally extending shoulder 240. The shoulder 240 is configured to rest on the upper edge 28 of the main body 12 when the extension member 230 is engaged with the main body 12. A lower end of the element 232 rests on the upper edge 40 of the blades 30 when the extension member 230 is positioned on the main body 12.

The extension member 230 is provided with an extension riser tube 242 having exterior threads 244 formed on the lower part thereof. The threads 244 are configured to matingly engage inner threads (not shown) of the riser tube 94 of the assembly 10. The extension riser tube 242 is provided with perforations 243, similarly to the perforations 96 formed in the riser tube 94.

A data collection port 250 is formed in the top part 232, because the data collection port 214 may be covered by the extension member 230. The extension member 230 allows introduction of additional bait units 248 in alignment with the bait units 14. The moisture retaining member 18 is placed over the uppermost bait unit, similar to the first embodiment described above.

The cap 16 can be used with the extension member 230 because the diameter of the extension member corresponds to the diameter of the upper portion 22. As can be seen in FIG. 10, the inner wall 23 of the upper portion 22 extends continuously with the inner wall 246 of the top part 236.

Although tap or rain water on the cellulose substance is believed to be sufficient for attracting foraging insects, it is envisioned that liquid attractant can be used instead of tap or rain water. Such sugar water can be poured through the opening in the cap 16 to make the bait station even more attractive to the insects.

The cap 16 can be colored in light or dark colors to increase or decrease the internal temperature of the main body and facilitate condensation. Depending on the climate where the system of the present invention is to be utilized, the cap can be made black or white.

Referring now to FIG. 20, FIG. 21, FIG. 22, & FIG. 23, another embodiment of the pest control system and method of the invention provides a modular design that allows different modules or combinations of modules to be incorporated into any given bait-station main body 312, to be taken out for inspection, for replenishment, and for replacement by other modules where desired.

Figure 28:
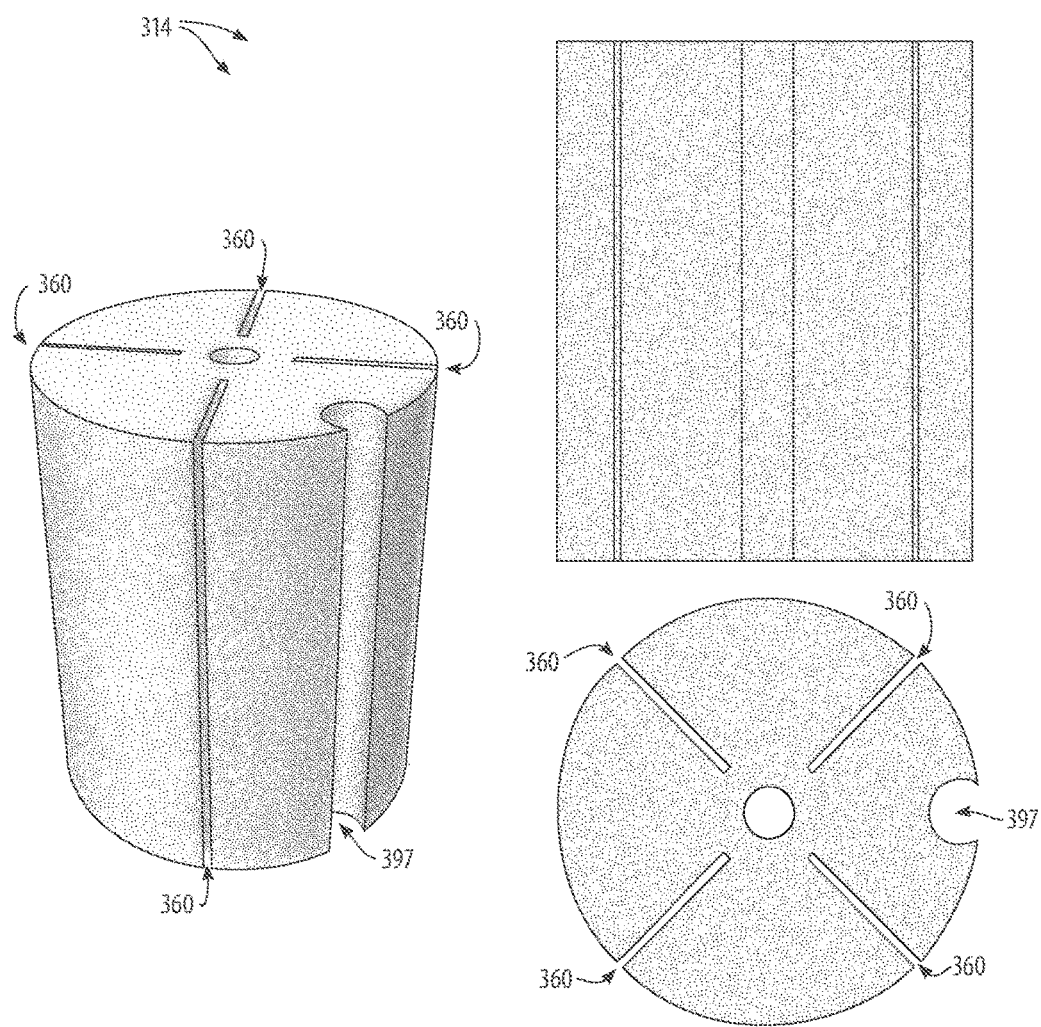
FIG. 28 illustrates a cellulose-food module of the embodiment of FIG. 20.
Figure 29:
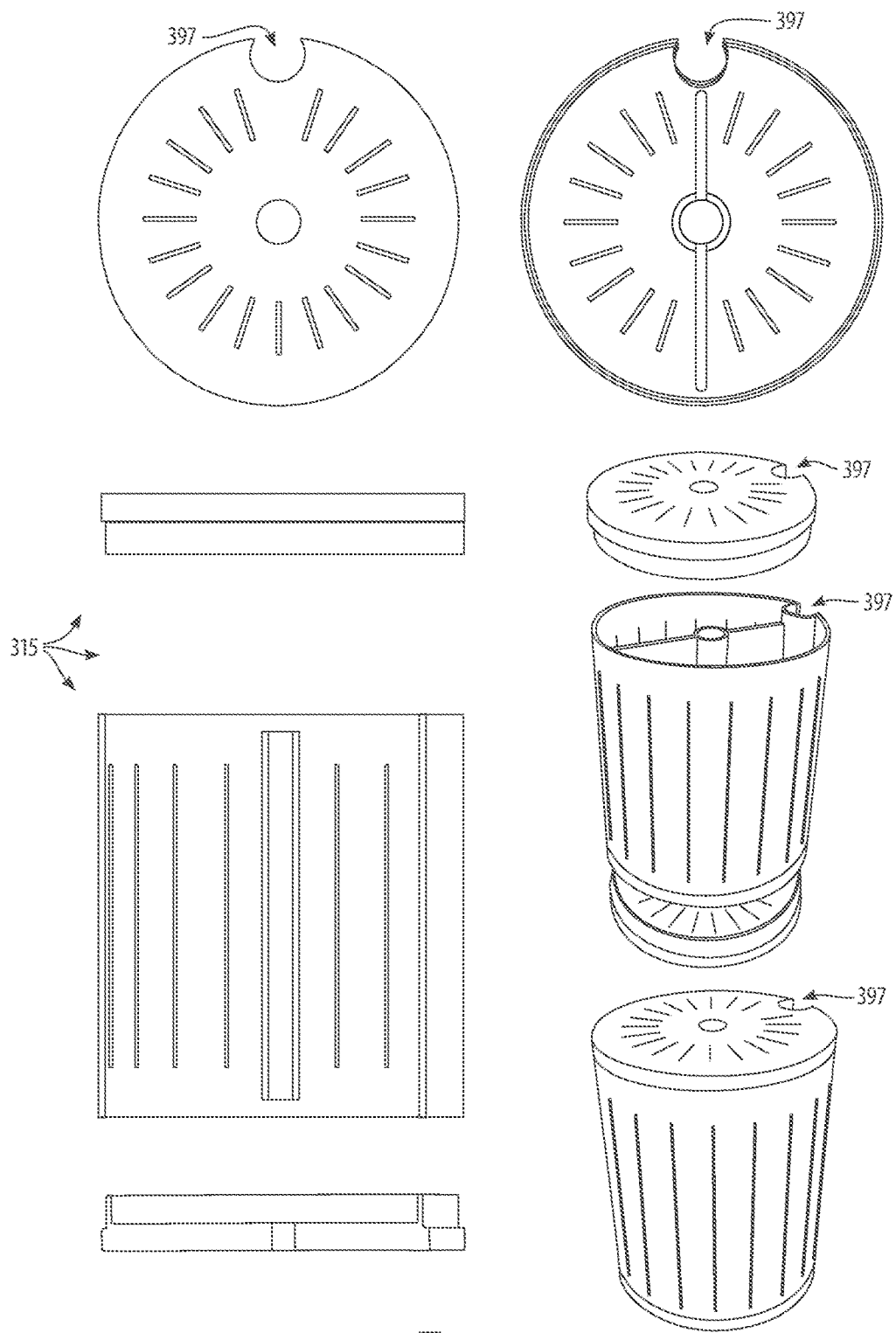
FIG. 29 illustrates a refillable cartridge module of the pest control system and method of the invention, which may be filled with active-ingredient, cellulose, or other material as desired.
Figure 32:
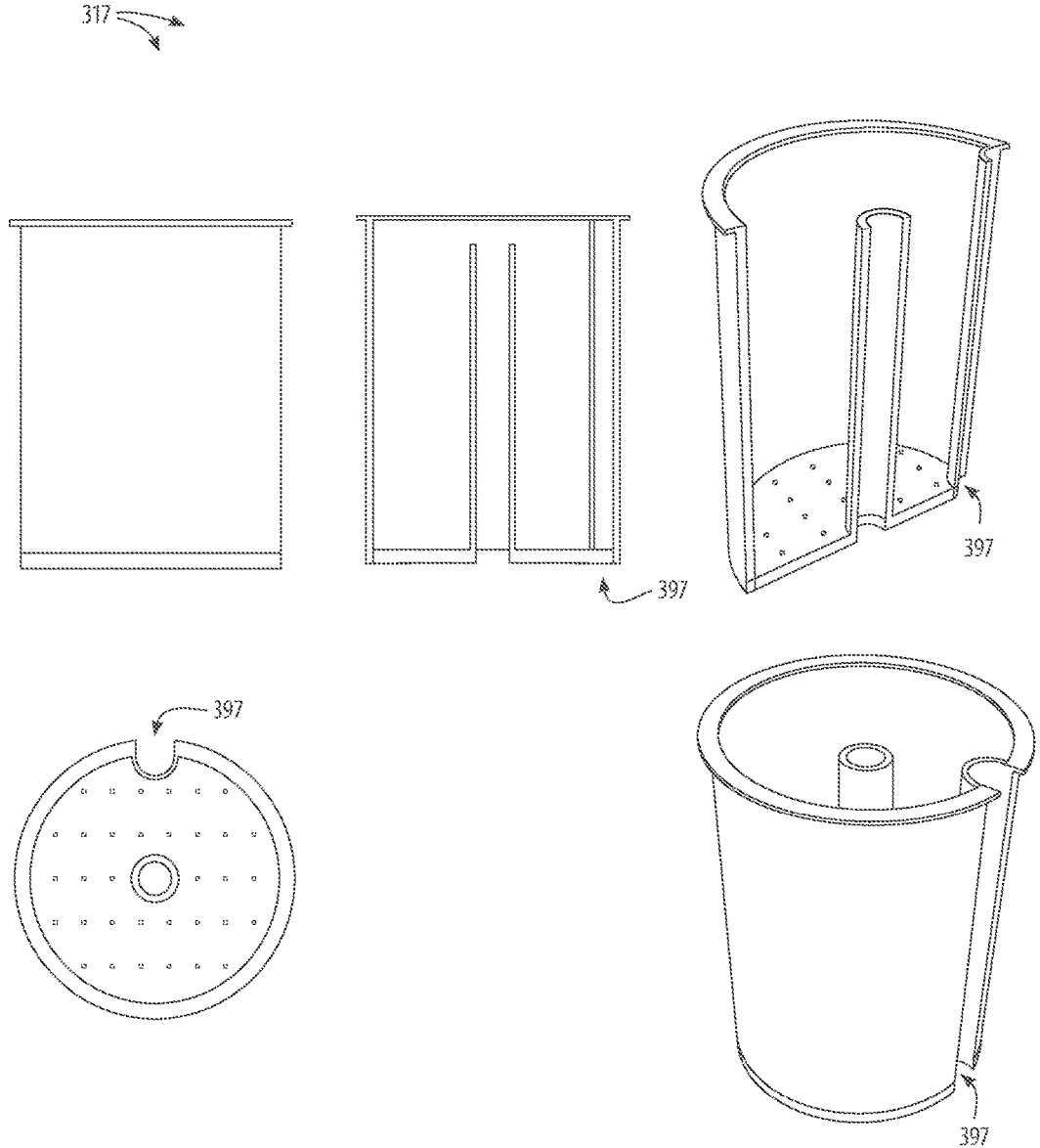
FIG. 32 illustrates a water-reservoir module of the pest control system and method of the invention.
Figure 38:
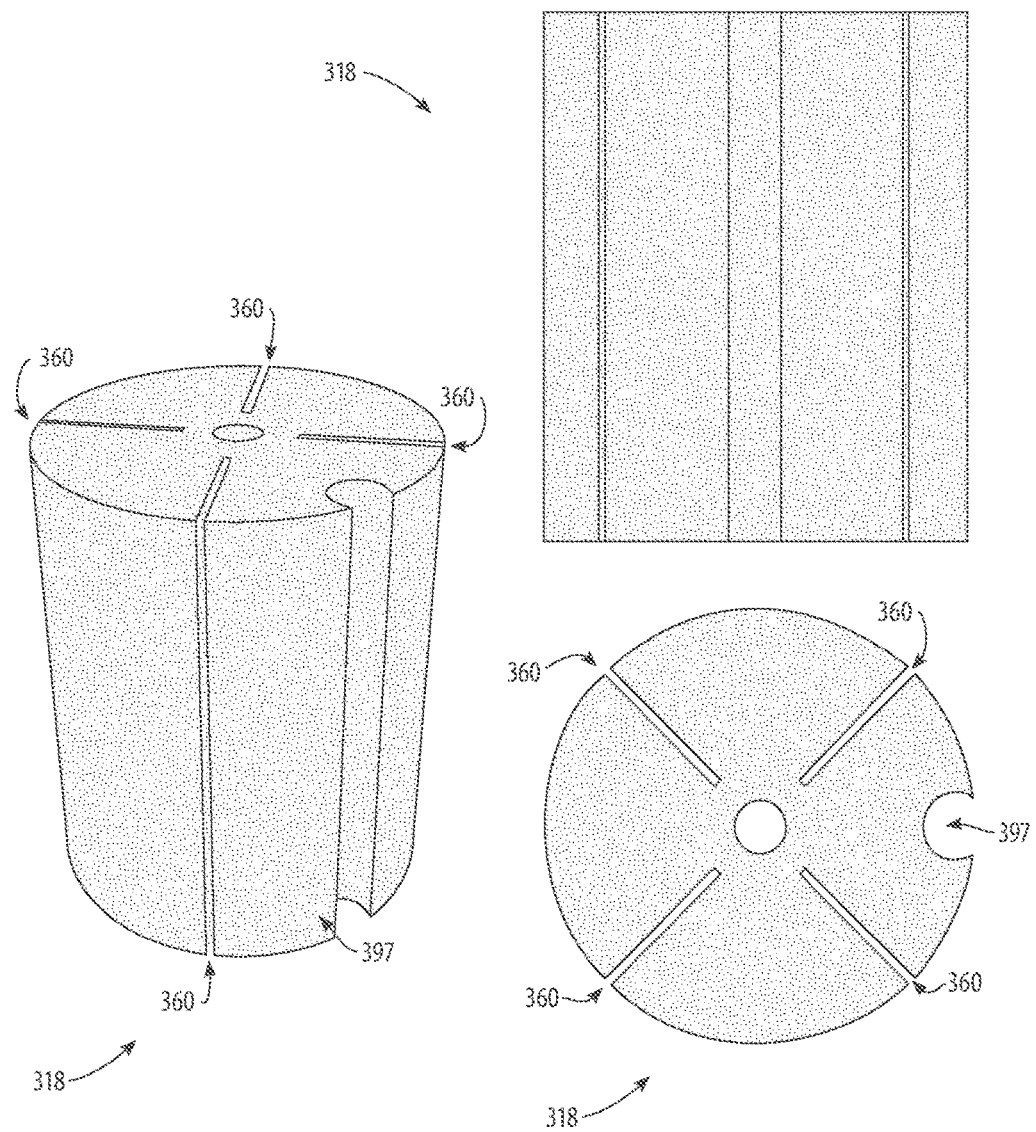
FIG. 38 illustrates a sponge module of the pest control system and method of the invention.
Figure 39:
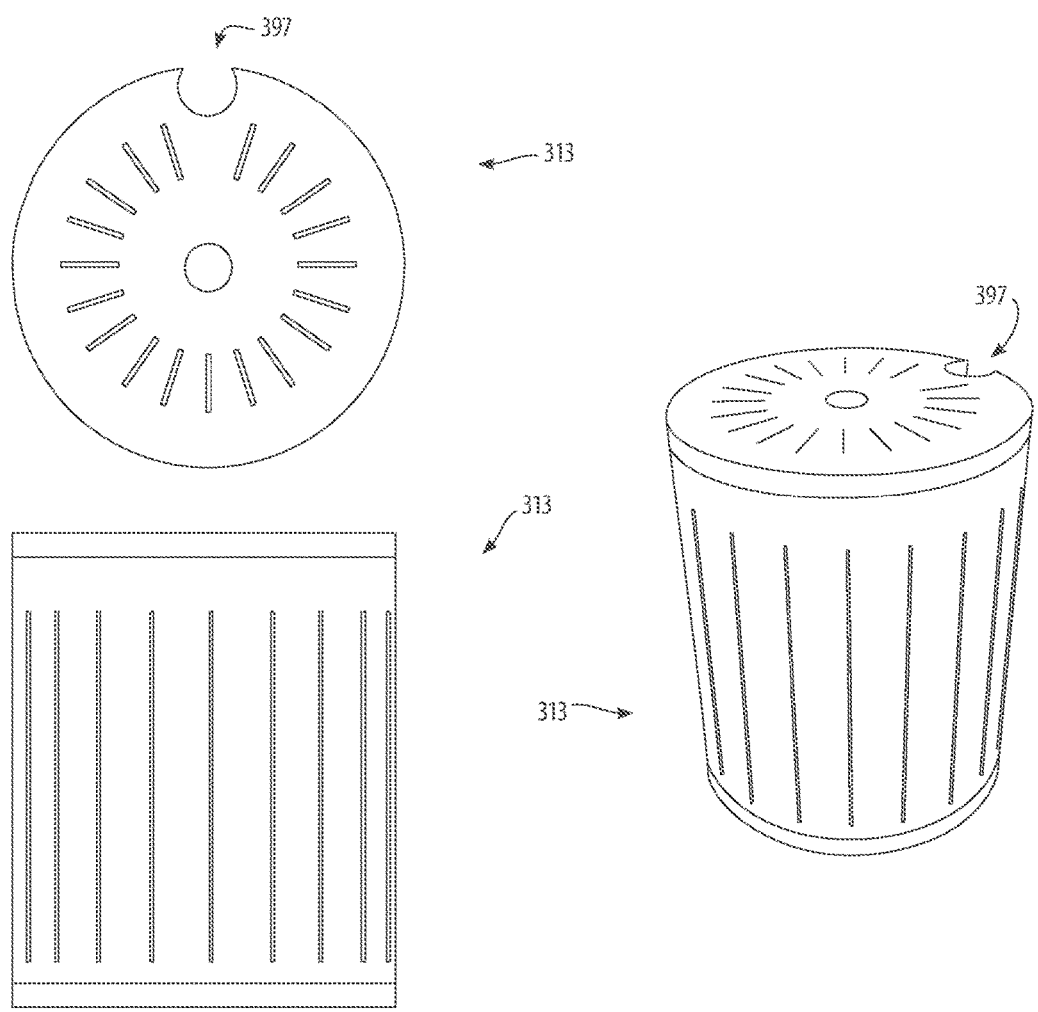
FIG. 39 illustrates a sealed cartridge module, which may contain active-ingredient, cellulose, or other appropriate material, of the pest control system and method of the invention.

Provided modules include a cellulose-food module 314 as illustrated in FIG. 28, a moisture retaining and releasing sponge module 318 as illustrated in FIG. 38, a refillable cartridge module 315 as illustrated in FIG. 29, a one-time use or sealed cartridge module 313 as illustrated in FIG. 39, and a water-reservoir module 317 as illustrated in FIG. 32. The refillable cartridge module 315 as illustrated in FIG. 29 and the one-time use or sealed cartridge module 313 as illustrated in FIG. 39 may be comprised of active-ingredient, cellulose, or other desired material, such as naphthalene. Each module is essentially cylindrical in shape, with two void spaces or holes or channels along the long dimension of the cylindrical module. A central, axial hole accommodates the vent shafts 394, allowing movement of gasses and liquids among the modules, as disclosed in detail above. This central hole is likely to be essentially circular or cylindrical to accommodate the vent shafts 394, but to remain close to the vent shafts for efficient transfer of liquids and gasses. An additional channel called a port-void 397 is provided along the side of the cylindrical module, essentially parallel with the central, axial hole. Although a range of positions and shapes of the port-void 397 will function, the port-void 397 must be the same on every module, so that all of the port-void 397 line up to form a single, continuous port-void when the invention is in use.

A portway 395 is provided in the main body 312 as a continuous perforated riser tube from bottom to top of the main body 312. The port-voids 397 of the various modules accommodate the portway 395.

Figure 21:
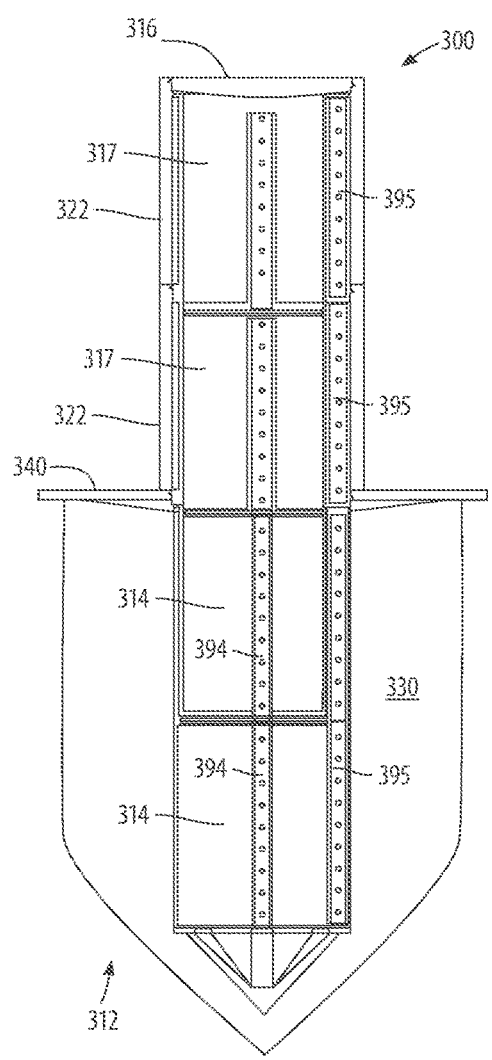
FIG. 21 illustrates the embodiment of FIG. 20, further having two extension sections.
Figure 22:
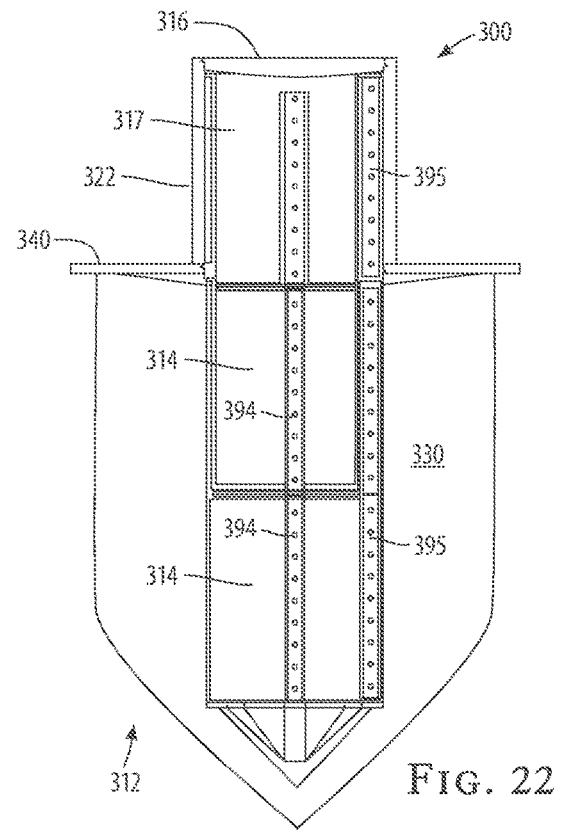
FIG. 22 illustrates the embodiment of FIG. 20, further having one extension section.
Figure 23:
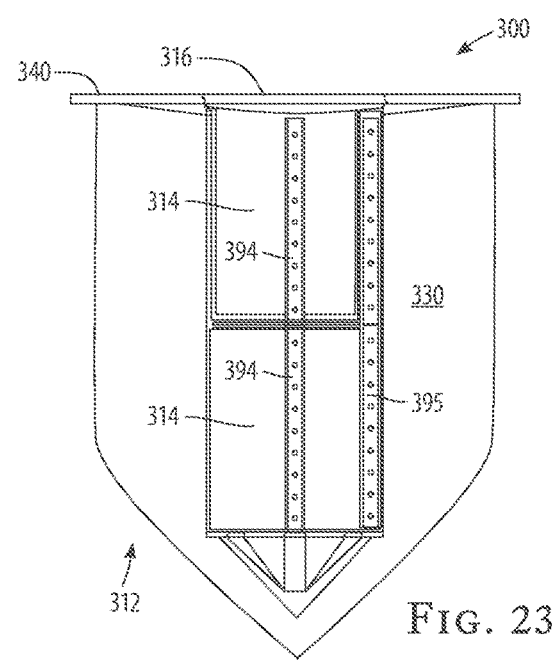
FIG. 23 illustrates the embodiment of FIG. 20, further having no extension sections.

The system can be extended above ground level using the provided extension sections 322, which allow the addition of more modules, such as the single additional water-reservoir module 317 illustrated in FIG. 22, and the two additional water-reservoir modules 317 illustrated in FIG. 21. Each extension section 322 provides a portway 395 which lines up with and continues the portway 395 of the main body 312.

Figure 24:
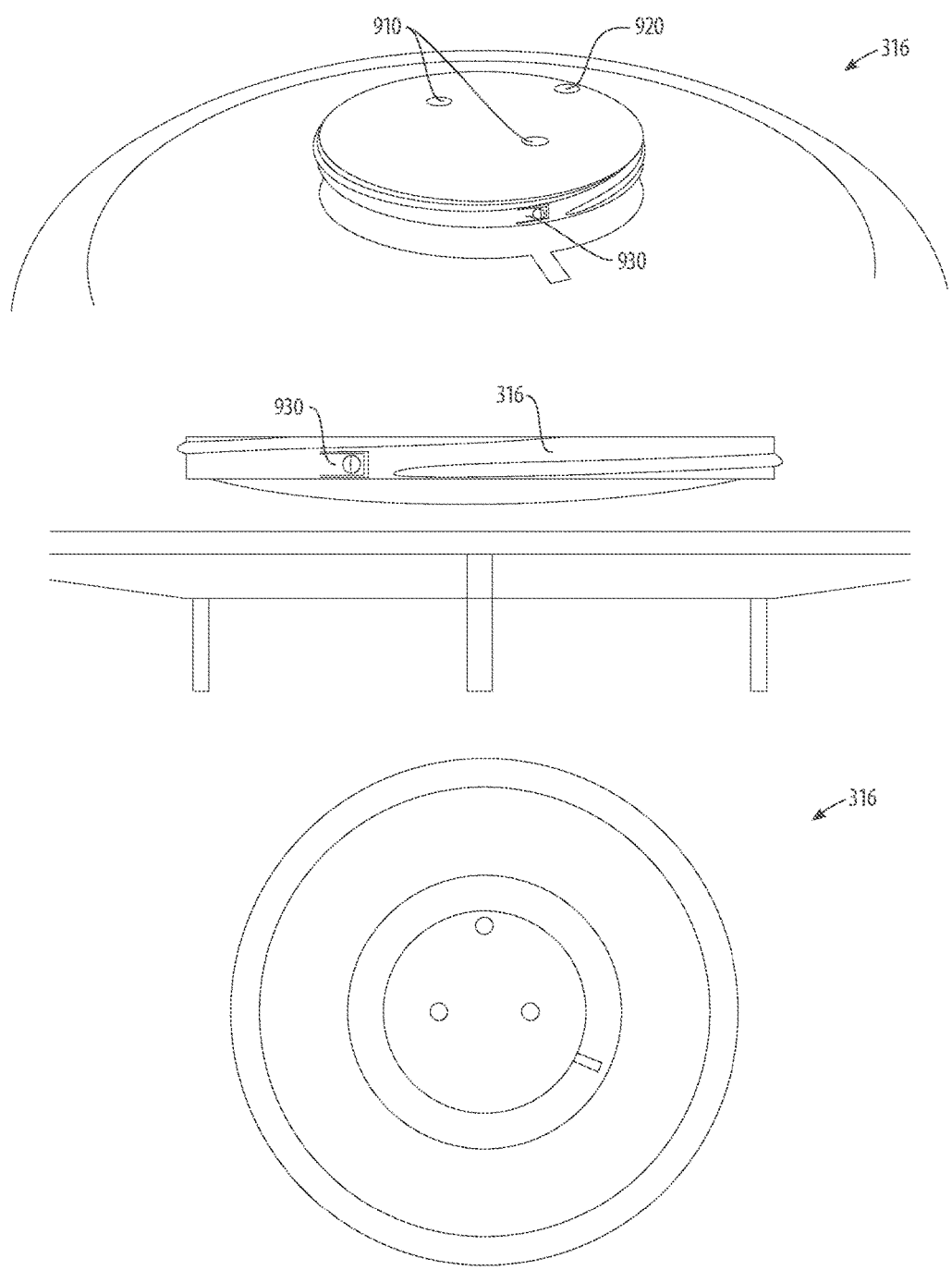
FIG. 24 illustrates the locking top of the embodiment of FIG. 20.

Referring briefly to FIG. 24, a locking top 316 is provided to enclose the system, either at the ground-level surface 340 of the main body 312 or at the open end of one or more extension sections 322. The lower connector portion of each extension section 322 matches the connector portion of the locking top 316, and the upper connector portion of each extension section 322 matched the connector portion of the ground-level surface 340 of the main body 312. Therefore, the connector portion of the main body can accommodate either a locking top 316 or an extension section 322, and the locking top 316 can be placed either at the ground-level surface of the main body or at the top end of one or more extension sections 322. Because of this universality of connectors, any particular installation of the system can be configured to hold the needed number of modules, and can be re-configured as needed after installation. The locking top 316 provides keyholes 910 for mounting or removing the top, and provides a porthole 920 aligned with the portway 395 below, allowing the temporary insertion of probes to measure conditions such as temperature, moisture, and the sounds or vibrations produced by, and indicating the presence of, insects. A locking tab 930 provides for secure but removable mounting of the locking top 316.

Referring briefly to FIG. 28 & FIG. 38, radial slots 360 are provided for the cellulose-food module 314 and the moisture retaining and releasing sponge module 318 for the purposes of creating more surface area and passageways for insects. Referring briefly to FIG. 29 & FIG. 39, slots are provided on the top, bottom, and side surfaces of the refillable active-ingredient cartridge module 315 and the sealed cartridge module 313 for the same purposes.

The refillable cartridge module 315 and the sealed cartridge module 313 cartridges may be filled with any variety of active ingredients or attractants, so the orchestrator of the system may choose which cartridge to employ in any particular instance. The one-time use sealed cartridge module 313, FIG. 39, provides a tamper resistant cartridge for a single use. Because it is meant to be used only once, the cartridge remains sealed throughout its insertion into and removal from the system. In contrast, the reusable refillable active-ingredient cartridge 315, FIG. 29, may be added to, cleaned out, and so forth, when it is emptied or at any point during its use. Because it is meant to be refillable, the lid is removable rather than tamper-resistant like the one-time use cartridge.

Figure 30:
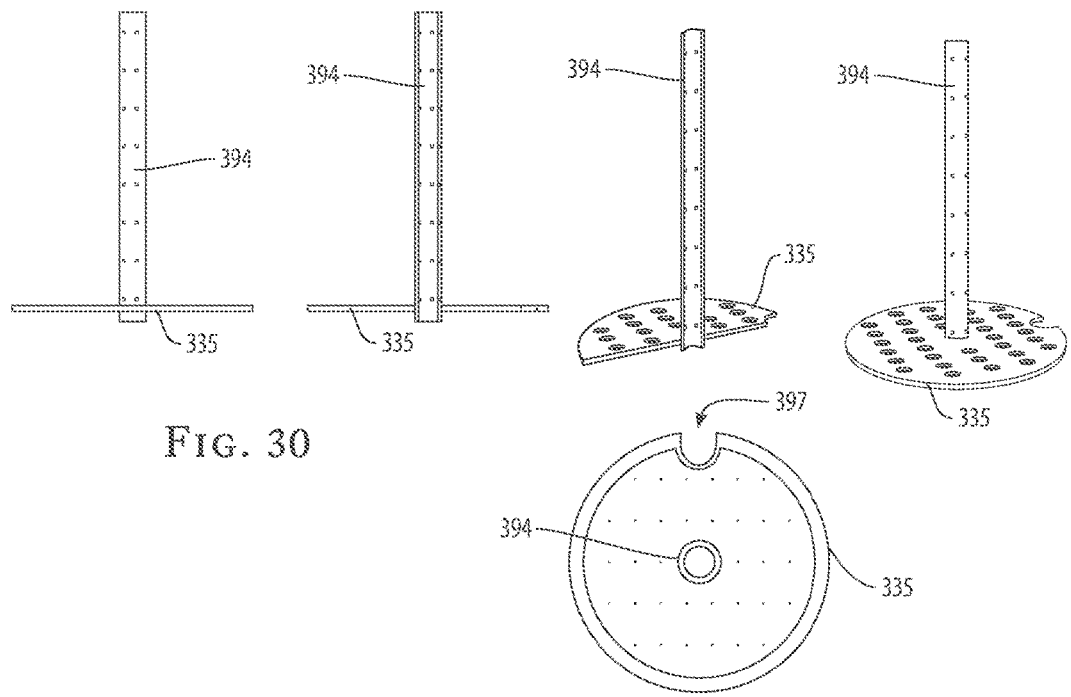
FIG. 30 illustrates a vent-shaft extension of the pest control system and method of the invention.
Figure 31:
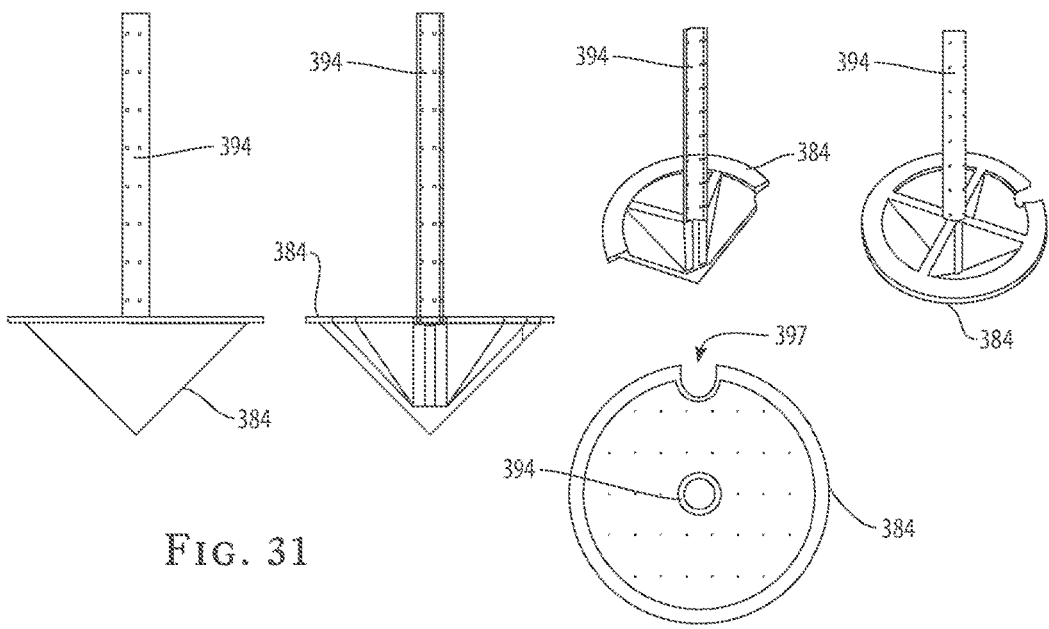
FIG. 31 illustrates a bottom vent shaft of the pest control system and method of the invention.

Referring briefly to FIG. 30 & FIG. 31, in this modular embodiment of the invention the central riser 94 is split into riser sections 394 incorporated into a bottom vent shaft 384 and a vent-shaft extension 335. In use, the vent shafts 394 of multiple, stacked sections line up to form a continuous riser shaft. The bottom vent shaft 384 has a flange having a flat top and an inverted-conical bottom shape to conform to the bottom of the main unit. The vent-shaft extension 335 has a flange of essentially wafer shape, which is perforated to allow passage of gasses and liquids. Both types of flanges perform a function of supporting the bottom surface of any of the modules, and provide a means of raising and lowering modules out of and into the main unit. Both types of flanges have a port-void 397 to line up with the overall port-void of the system in use.

Figure 40:
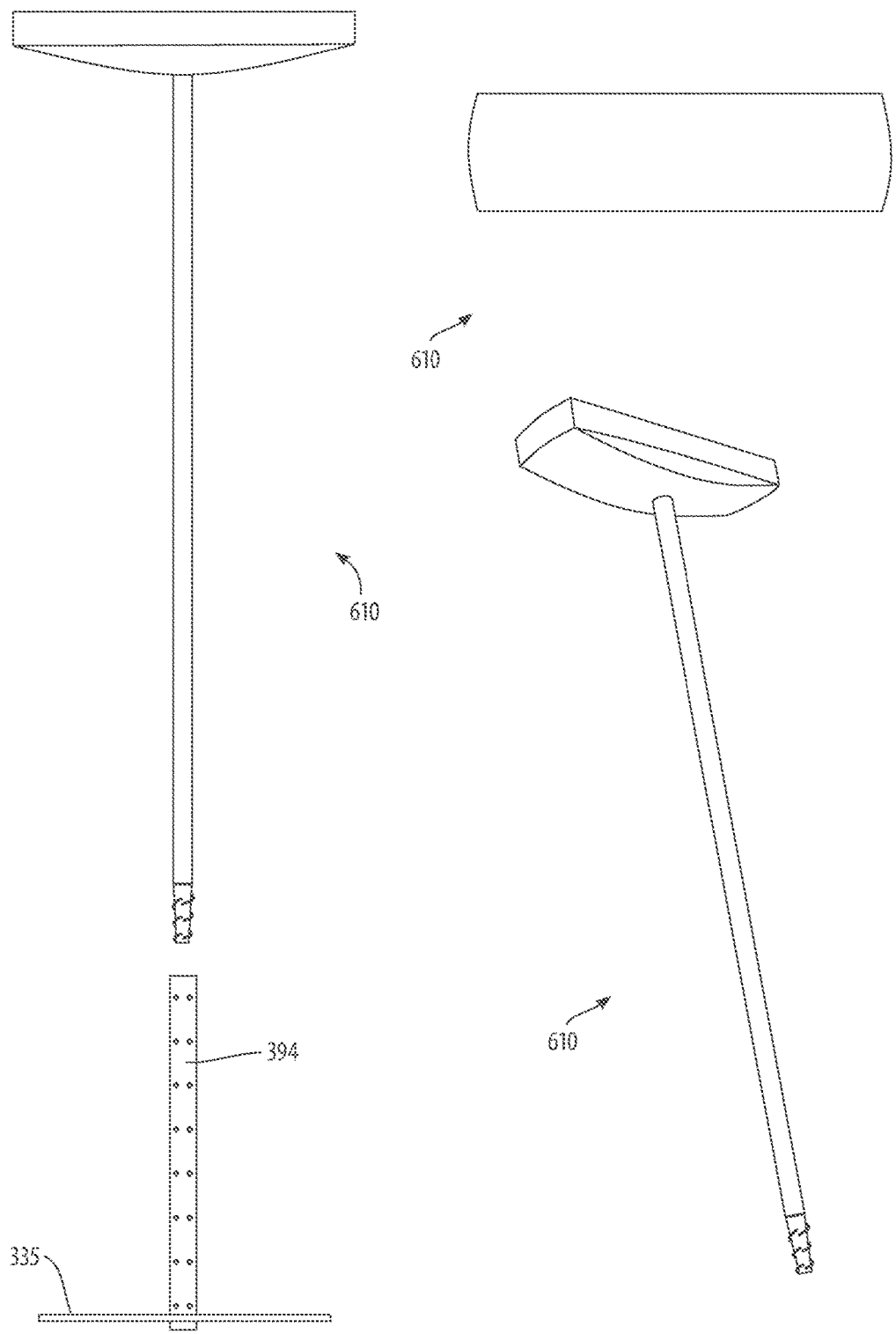
FIG. 40 illustrates a vent-shaft extraction tool of the pest control system and method of the invention.

Referring briefly to FIG. 40, optionally a vent-shaft extraction tool 610 can be provided for insertion and removal of modules for installation, inspection, and maintenance purposes. The vent shaft 394 of the vent-shaft extension 335 is provided with internal threads that conform to the threaded lower end of the vent-shaft extraction tool 610. The vent-shaft extension 335 supports a module, in use, and the module-and-extension assembly can be put in or taken out with the appropriate engagement and disengagement of the vent-shaft extraction tool 610.

Figure 25:
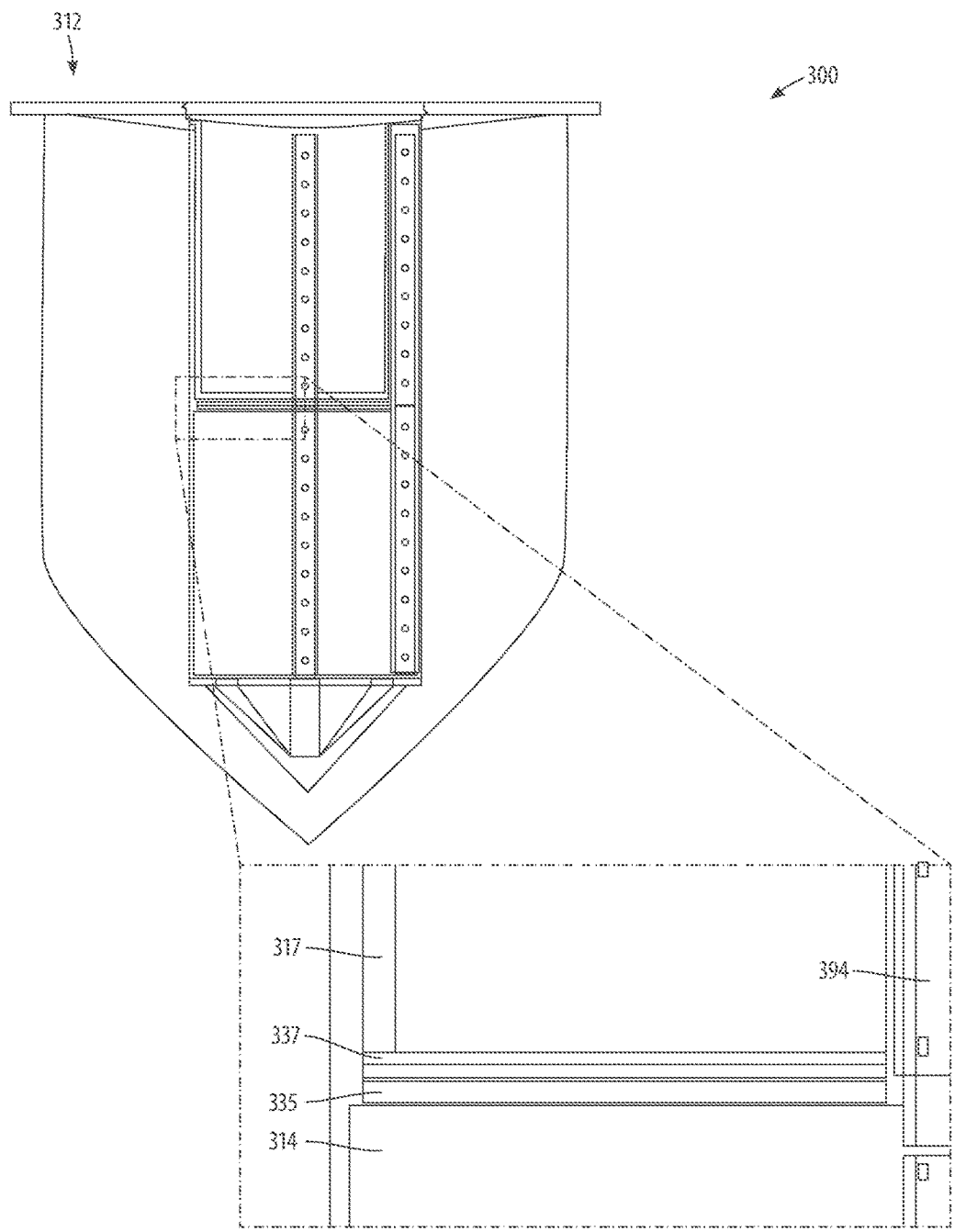
FIG. 25 illustrates a detail view of the embodiment of FIG. 20, illustrating the cellulose-food module in conjunction with a water reservoir.

Referring briefly to FIG. 25, a cellulose wick 337 is provided to cover both the flange and the vent shaft 394 of each vent-shaft extension 335, in order to facilitate the distribution of moisture within the system. The configuration illustrated shows an installation having a cellulose-food module 314 at the bottom with a water-reservoir module 317 above. The cellulose wick 337 in contact with the flange and the shaft extension of the vent-shaft extension 335 absorbs water from the water-reservoir module 317 at a controlled rate, and allows that water to migrate through the perforations in the flange and the shaft to the top portions and the inner portions of the cellulose-food module 314.

Figure 26:
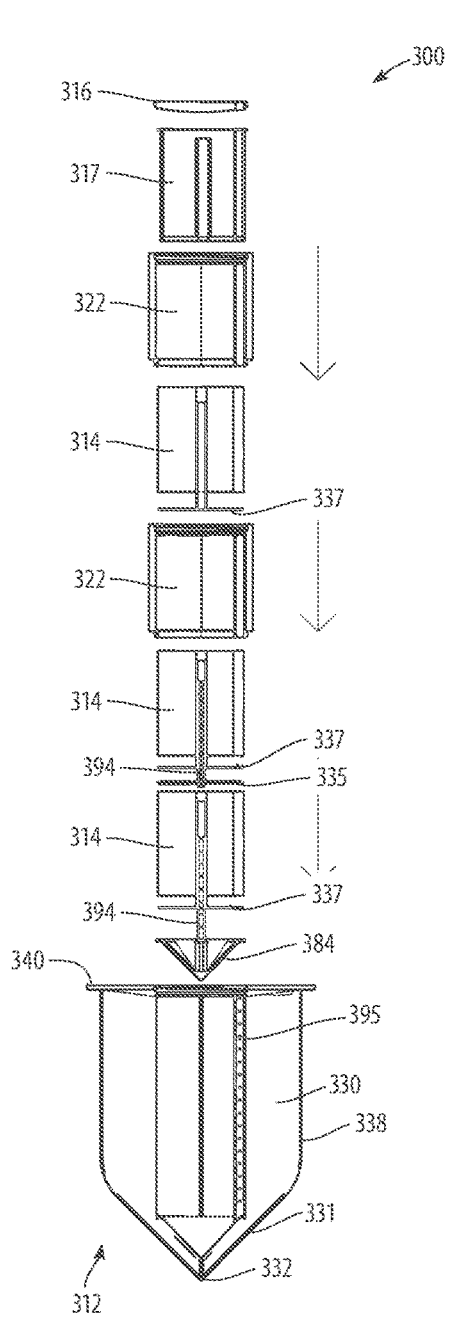
FIG. 26 is a side exploded view of the embodiment of FIG. 20.
Figure 27:
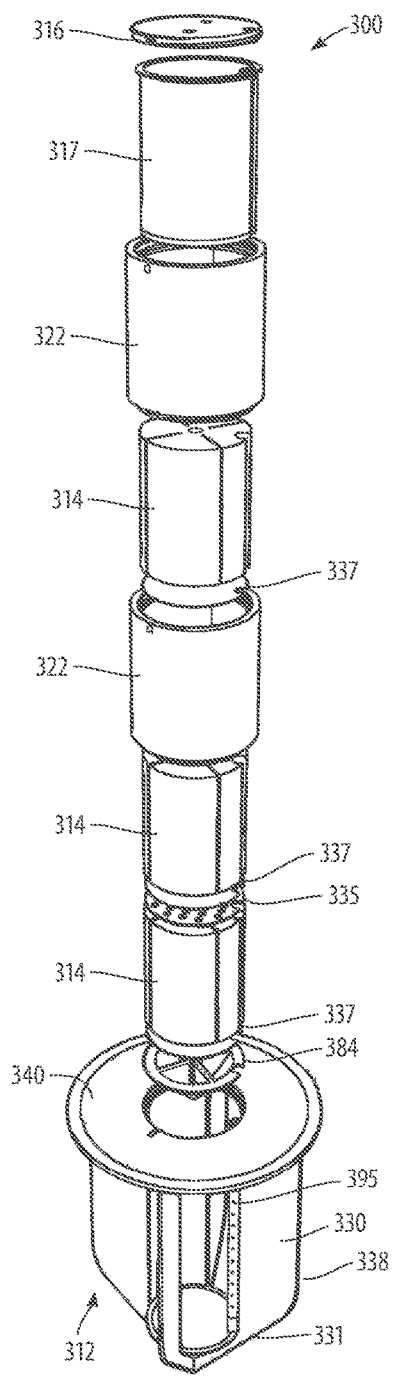
FIG. 27 is a perspective exploded view of the embodiment of FIG. 20.

Referring to FIG. 26 & FIG. 27, illustrating exploded views of this modular embodiment of the invention, the main body 312, installed below ground up to the ground-level surface 340, accommodates two cellulose-food modules 314, with the lower one mounted on a bottom vent shaft 384 and the upper one mounted on a vent-shaft extension 335, both having vent shafts 394. Cellulose wicks 337 are placed around the flanges and vent shafts. Above the ground-level surface 340, two extension sections 322 are mounted, the lower one accommodating another cellulose-food module 314, and the upper one accommodating a water-reservoir module 317. The slowly released moisture from the water reservoir will keep the cellulose-food modules moist. This installation is closed by a locking top 316 mounted to the terminal extension section. The locking top can be easily removed, with the proper key, and the water-reservoir module can be easily refilled as needed.

Figure 41:
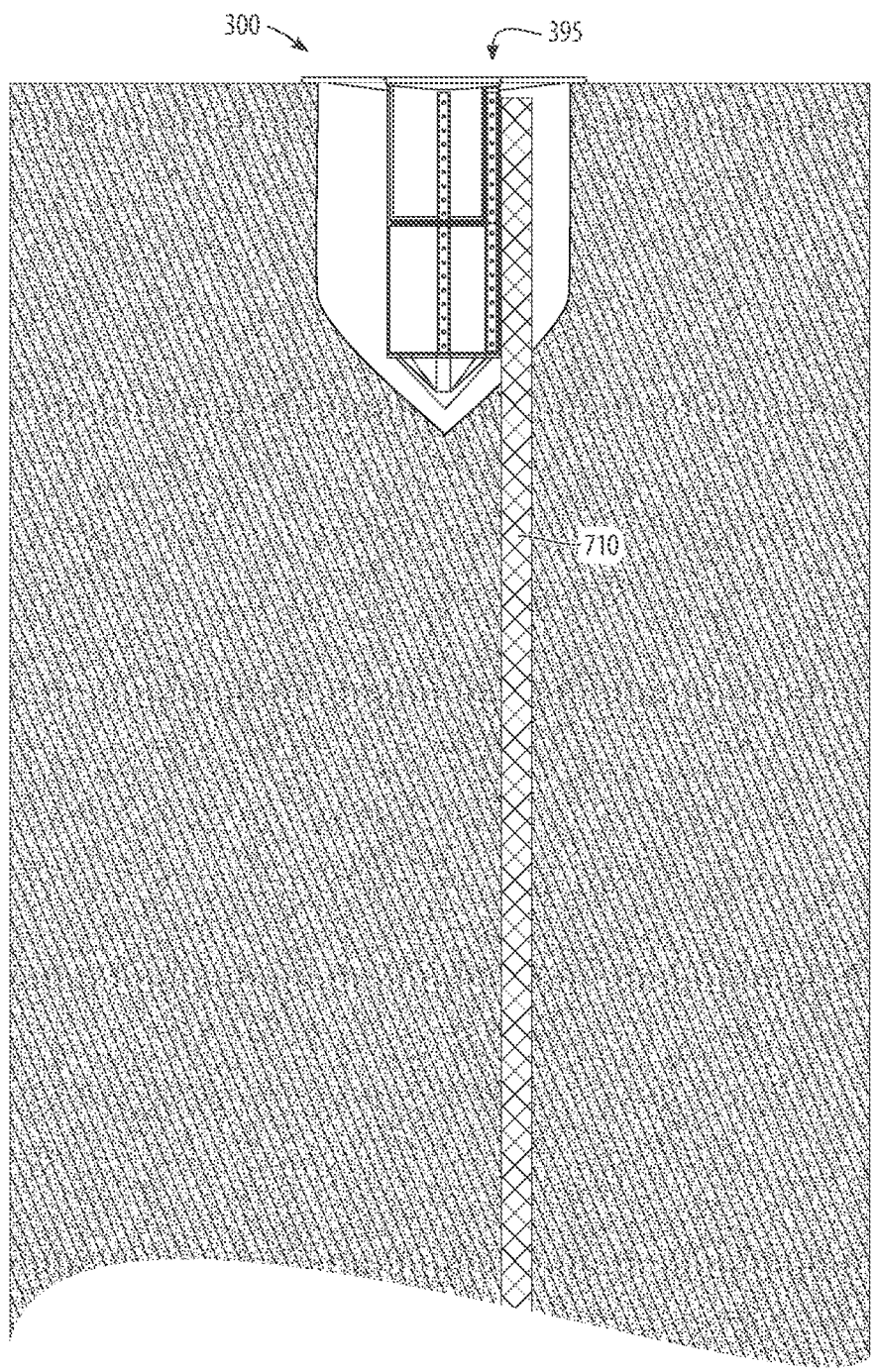
FIG. 41 illustrates a ground-water wick of the pest control system and method of the invention.

Referring now to FIG. 41, another, optional means of providing extra hydration to the pest control system 300 is to provide a ground-water wick 710 placed into a hole that has been drilled, preferably down to the water table. This wick 710 will draw moisture up to the pest control system 300 if the moisture level inside the system is dryer than the moisture level deeper underground, which is likely. The ground-water wick 710 can be brought into contact with the portway 395, which can accept and distribute moisture through its perforations. The ground-water wick 710 can be a cellulose wick, wherein the wick itself is made of or includes cellulose material that acts as its own attractant to the termites. The wick doubles as (1) an attractant to the pests and (2) a source of absorbing groundwater and transferring it to any cellulose material. The wick is removable and may be extracted from the system once it has been saturated with groundwater and/or has served its purpose as an attractant to the termites.

Figure 44:
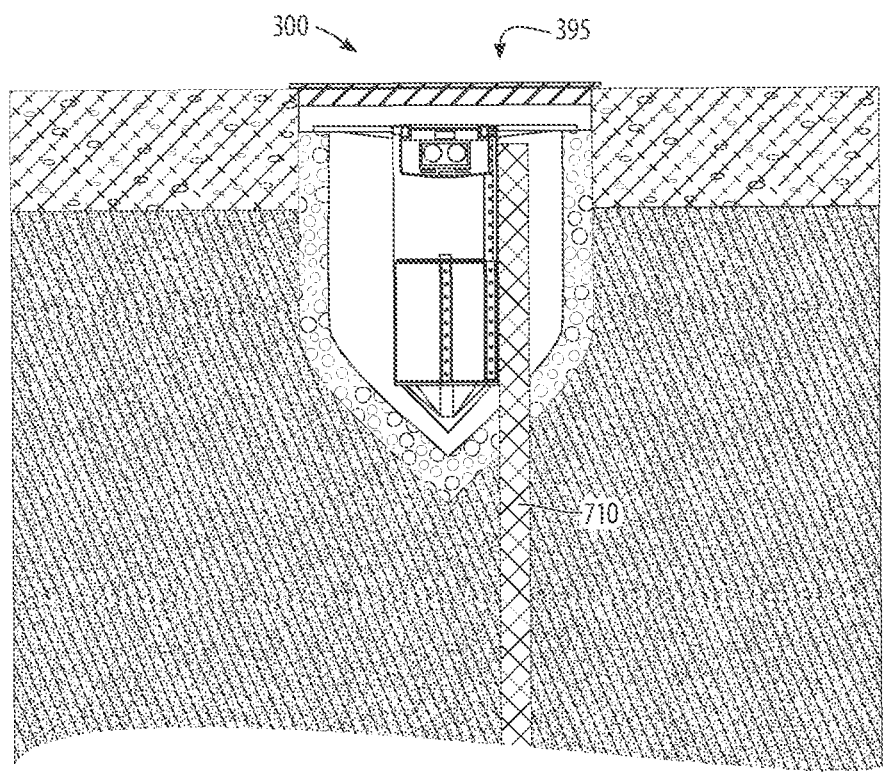
FIG. 44 illustrates the retrofit installation of the pest control system of the invention in an existing opening in a concrete slab, and with a display of the groundwater wick in use in the system.

Referring now to FIG. 44, this modular embodiment of the invention can be placed into a hole formerly containing another bait station or pest control system, or can be a new installation as disclosed above. A retrofit installation through a concrete slab is illustrated, with an optional ground-water wick 710. Such a retrofit modification to an existing pest control system creates a higher surface area ratio of cellulose to soil. It is desirable to have a large amount of direct contact between the soil, in which the termites live and burrow, and the cellulose of the pest control system. The direct contact allows for an easier avenue for the termites to engage in the pest control system. In modifying an old, preexisting pest control system, the cap may be removed and the preexisting system replaced with the new system. In placing the new system in the previous hole, a soil additive may be added as a filler surrounding the new system. The soil additive doubles as a sealant, plugging in any gaps between the preexisting hole and new system, and as a manner of increasing the soil-to-cellulose surface area, as mentioned above. Upon placement of the new system and any desired soil additive into the preexisting concrete system, the old cap may be used to seal the new system underground.

Figure 42:
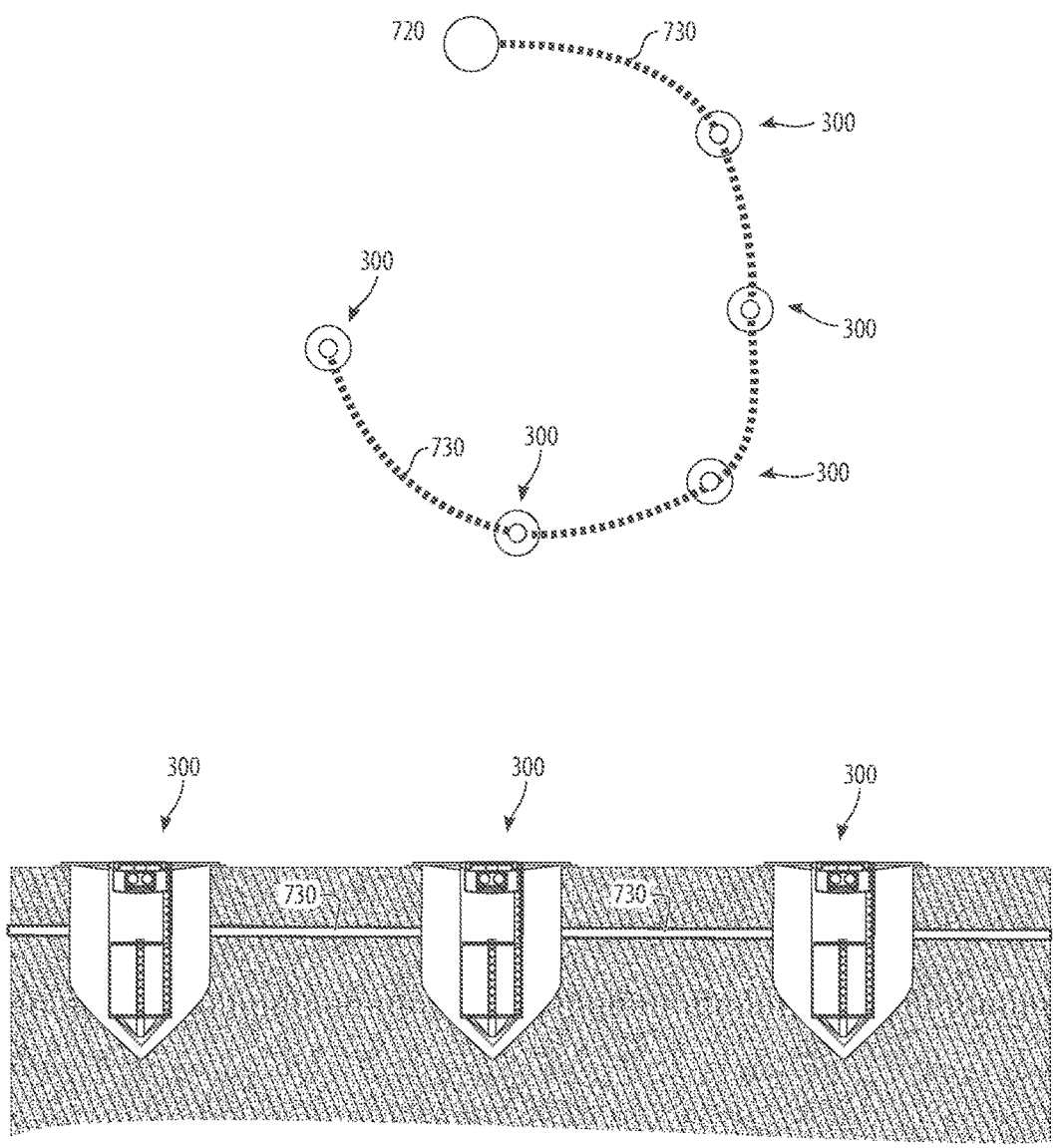
FIG. 42 illustrates an external water source and hydration line of the pest control system and method of the invention.

Referring to FIG. 42, another, optional provision is a "daisy chain" external hydration line connecting the several instances of the system, as a supplemental source of moisture for the system. Wood saturated with water is more attractive to termites, and so it may be desirable in certain circumstances to provide a larger source of water in the system to saturate the wood. An external water source 720, such as a well, pond, rain barrel, or water tap provides water via a hydration line 730.

Figure 35:
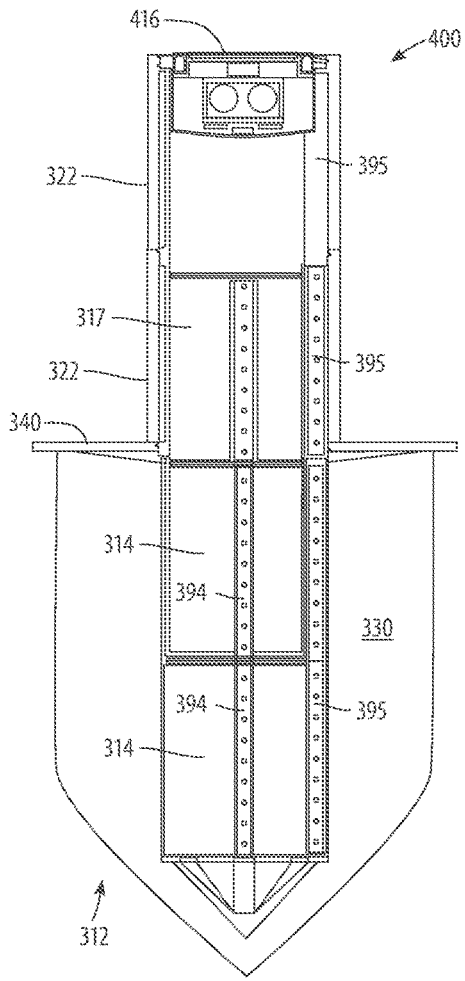
FIG. 35 illustrates the alternate-feature embodiment of the pest control system and method of the invention, further having two extension sections.
Figure 36:
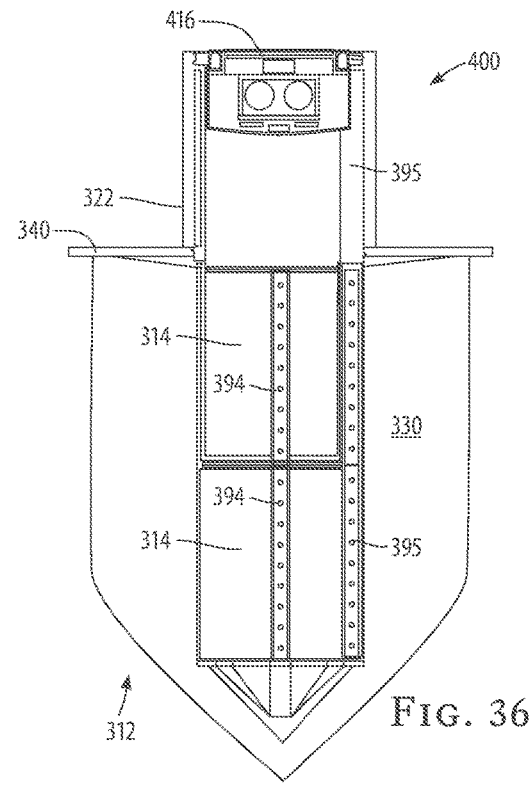
FIG. 36 illustrates the alternate-feature embodiment of the pest control system and method of the invention, further having one extension section.
Figure 37:
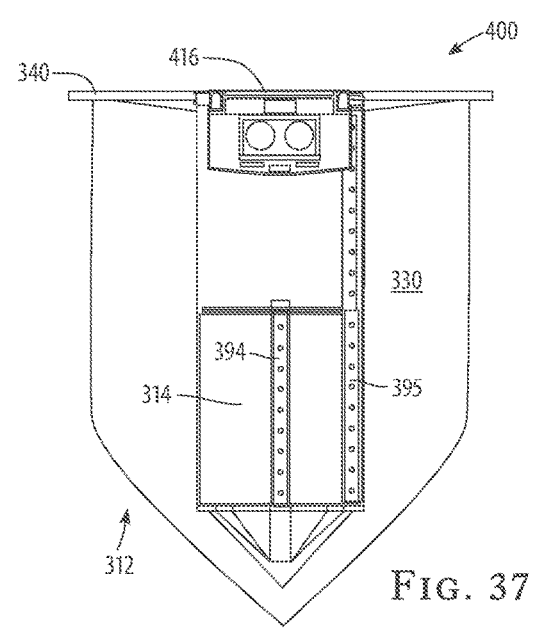
FIG. 37 illustrates the alternate-feature embodiment of the pest control system and method of the invention, further having no extension sections.

Referring now to FIG. 35, FIG. 36, & FIG. 37, another embodiment of the pest control system and method 400 provides an alternate-feature cap 416 in lieu of a locking top 316. The alternate-feature cap 416 mounts to either the ground-level surface 340 of the main body 312 or to the extension section 322, in the same way as the locking top 316, and therefore can be used to close various and changeable configurations of the system. The top surface of the alternate-feature cap 416, when mounted, sits at essentially the same level as the locking top 316, which is essentially flush with the ground-level surface 340 or extension section 322. The enhanced features of the alternate-feature cap 416 are housed in a portion of the cap that hangs down from the top surface, and occupies the upper portion of the space inside the main body or extension section, as shown.

Figure 33:
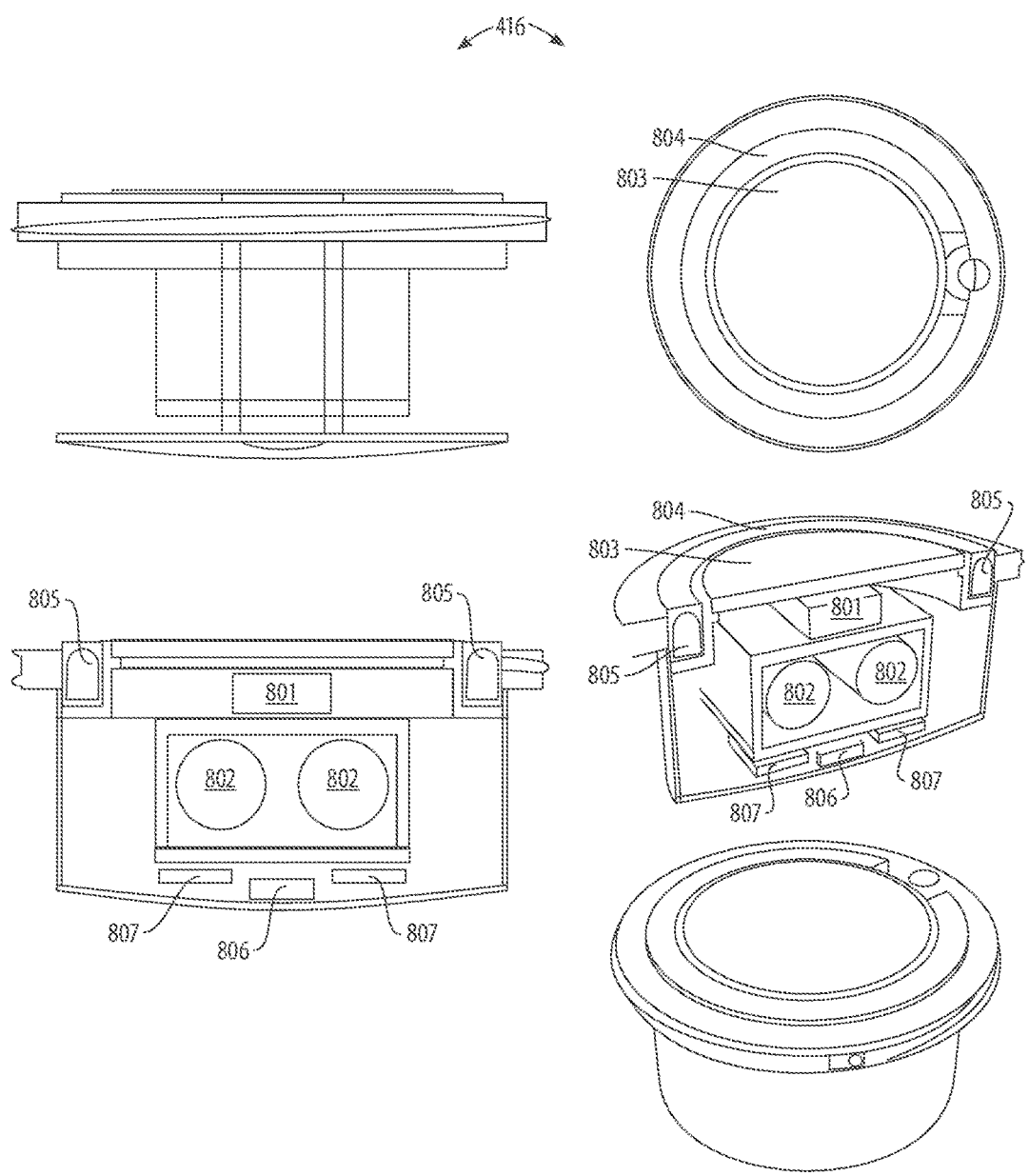
FIG. 33 illustrates the alternate-feature cap of an alternate-feature embodiment of the pest control system and method of the invention.
Figure 34:
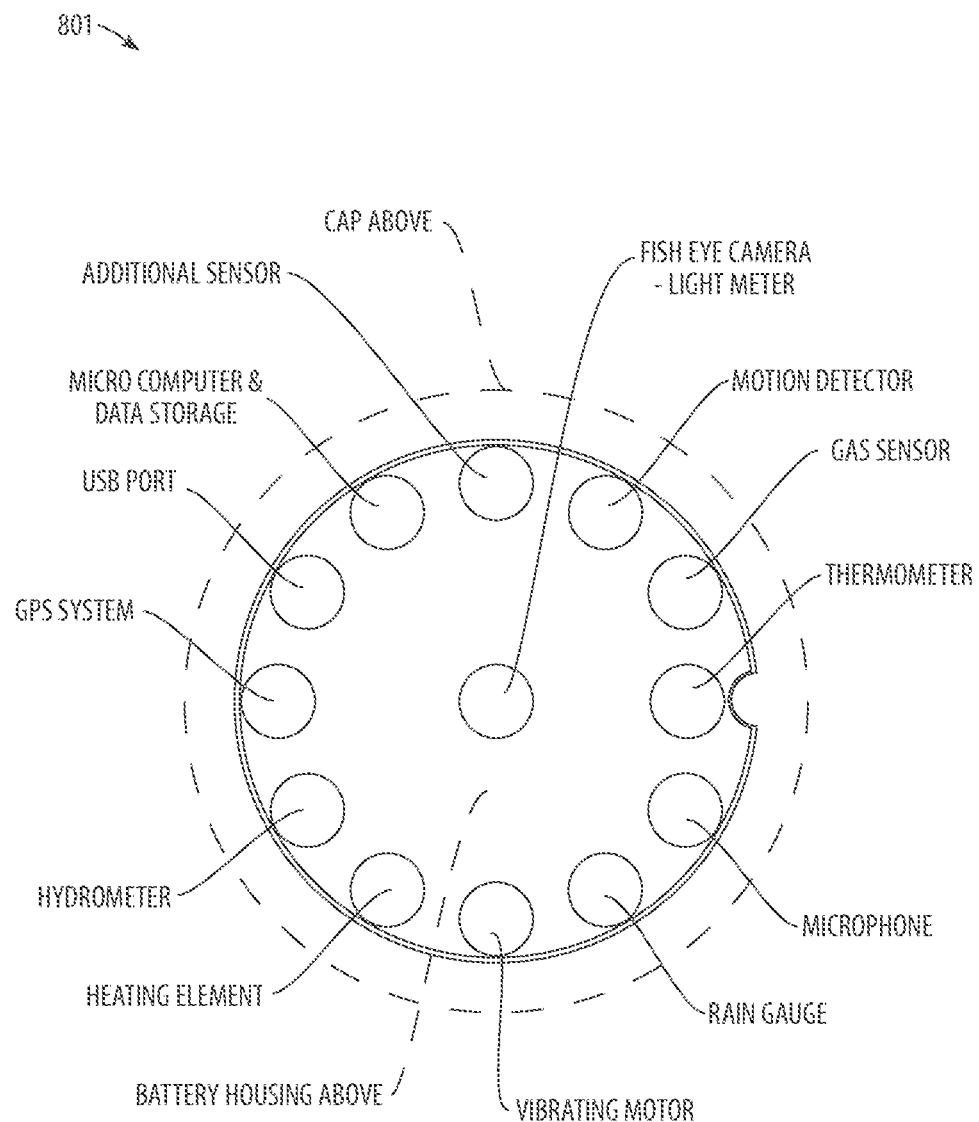
FIG. 34 illustrates capabilities of the alternate-feature cap of an alternate-feature embodiment of the pest control system and method of the invention.

Referring now to FIG. 33 & FIG. 34, the alternate-feature cap 416 provides various enhancements that may increase the productivity of the system. It may include, without limitation, a vibrator 806, which acts as an attractant to termites; a heating element 807, which controls the temperature and, accordingly, overall environment of the system; a battery bank 802 or solar panel 803 for power; and a sensor array 801 for monitoring the various conditions of the system. The sensor array 801 may include, without limitation, a microphone or camera to monitor the termite activity of the system. The alternate-feature cap 416 can provide an activity-indicator light or lights 805, optionally with a reflector 804. The light or lights 805 of the alternate-feature cap 416 may also be optionally adjusted to act as a further attractant to the insects, which are traditionally attracted to a light source.

The sensor array 801 can be provided with such capabilities or features as an upward-facing camera and/or light meter, a motion detector, a gas sensor, a thermometer, a thermo-imaging sensor, a microphone, a rain gauge, a hydrometer, a GPS system, and a USB port. The sensor array 801 can optionally have data-storage, data-computation, and data-communication capabilities. The data captured by the sensor array 801 provides important information, such as timing information, temperature, humidity levels, and so forth, in maintaining the effectiveness of a given installation of the system, and in making decisions about ongoing and future courses of treatment. Appropriate analysis of the data captured by the sensor array 801 may lead to altering of the overall environment of the system, such as the temperature, humidity, and so forth, in a manner that creates a more attractive environment for the termites. Appropriate analysis of the data captured by the sensor array 801 may additionally lead to the implementation of preferred environments for the termites in future operations of the pest control system. Through the data collection of the sensor array 801, the preferred environments of the termite colonies may accordingly be replicated, with appropriate modifications depending on the specifics of the future pest control system site, to provide for more effective attraction, interception, and elimination of termites in the future.

Figure 45:
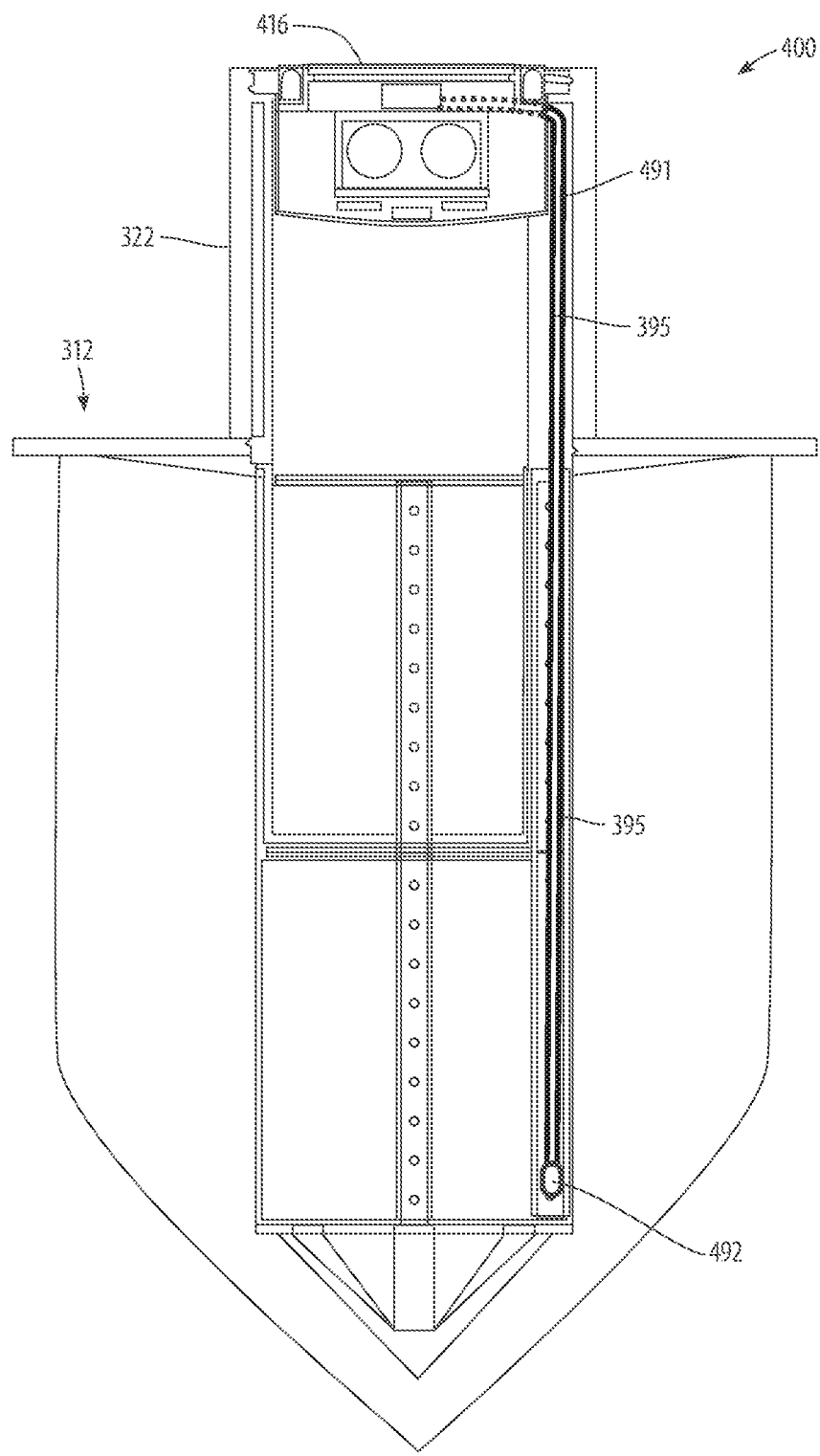
FIG. 45 illustrates an in-port sensor and down-port lead of the pest control system and method of the invention.

Referring to FIG. 45, another, optional provision is an in-port sensor 492 connected via a down-port lead 491 to the alternate-feature cap 416 in an installation of the system. The placement of such an in-port sensor 492 at the bottom of, or somewhere along the path of the portway 395, might be desirable in several circumstances, such as when, as illustrated, the alternate-feature cap 416 is located above ground level on an extension section and is therefore exposed to different heating and cooling and other effects than the underground main body 312. Also, some types of measurement might be affected by heat, sound, or motion self-generated by the alternate-feature cap 416, masking and interfering with measurement of conditions elsewhere in the system. The down-port lead 491 can be a separate wire or cable placed inside the portway 395, as illustrated, or can be wires or conducting traces incorporated into the portways 395 of the main bodies 312 and the extension sections 322 during manufacture.

Figure 43:
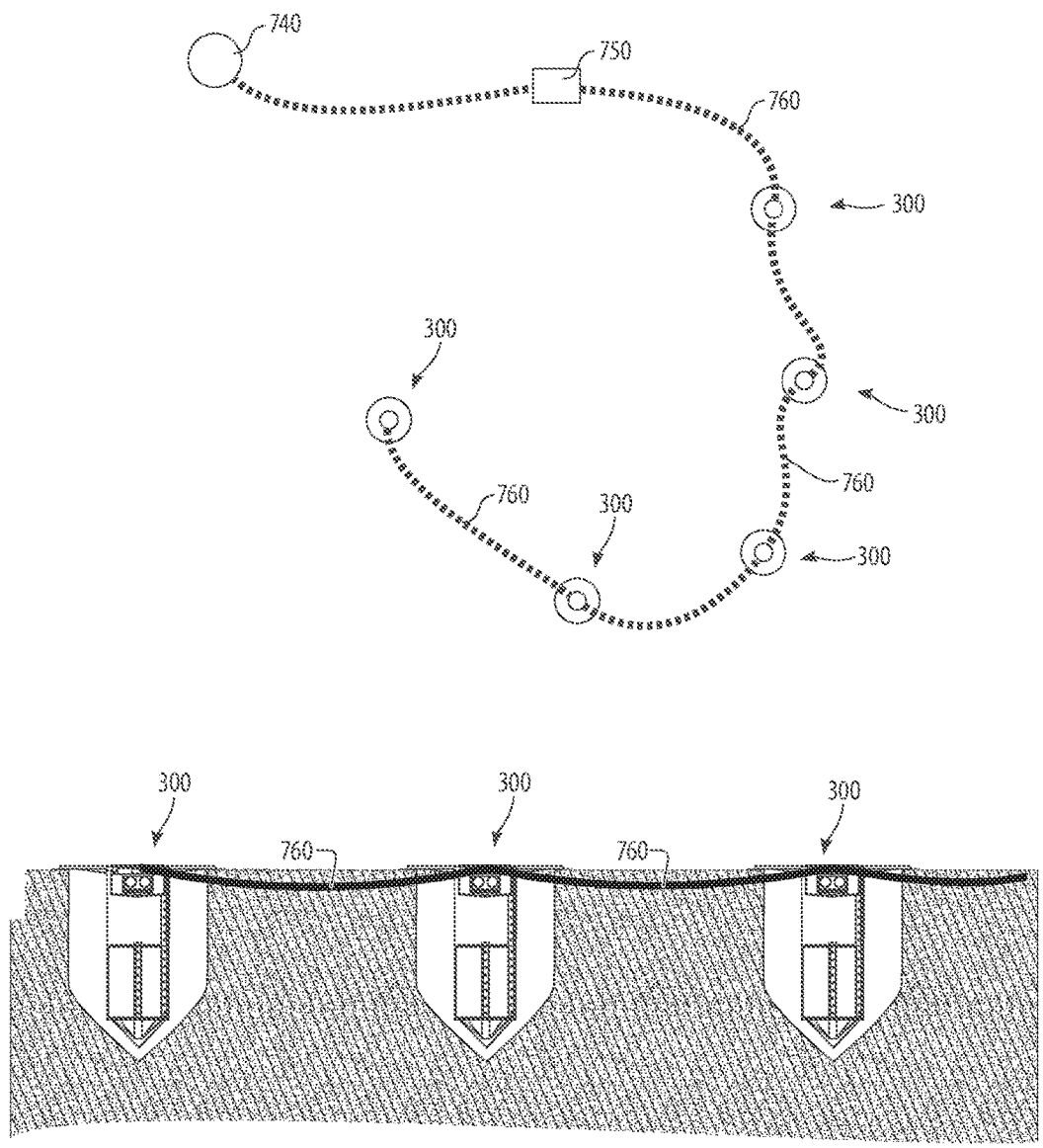
FIG. 43 illustrates an external power source, transformer, and buried electrical cable of the pest control system and method of the invention.

Referring to FIG. 43, another, optional provision is an external power source chain for several instances of the system, which serves a dual purpose. First, it serves to provide electric power to the overall system, which may require power for various monitoring activities of the system. Second, the electromagnetic current itself acts as an attractant to the termites and may draw more pests into the system. Power from an external power source 740 is passed through a transformer 750 in order to bring it to a low voltage that would be appropriate for any electronic components, and is safely transmitted on the buried electrical cable 760, providing power to several instances of the system while at the same time creating a field of electromagnetic current detectable by insects.

Figure 46:
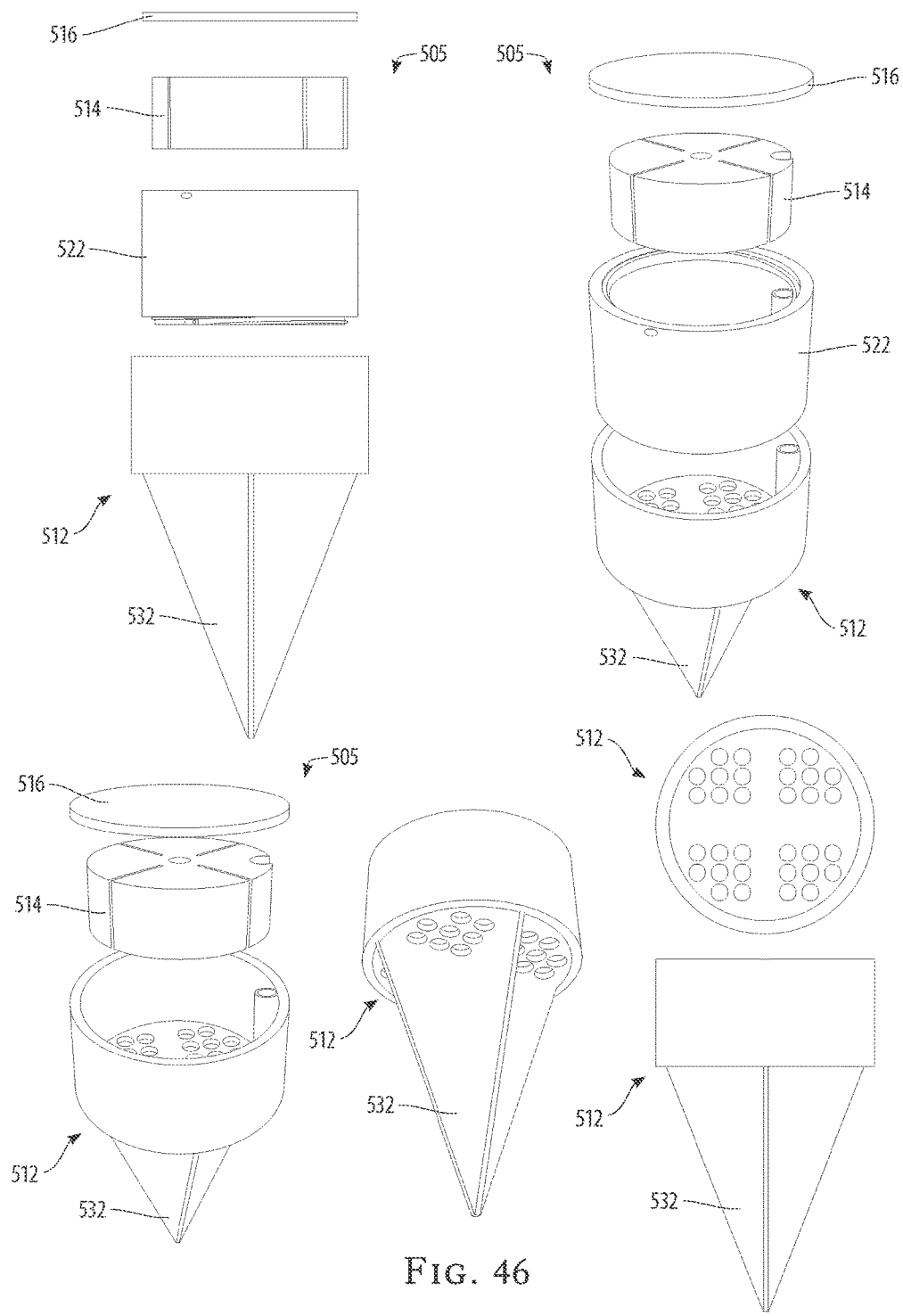
FIG. 46 illustrates a simplified spiked embodiment of the pest control system and method of the invention.

Referring to FIG. 46, an alternative simplified spiked embodiment 505 of the pest-control system and method provides a basic bait station having a simple main body 512 having an anchoring spike 532 that is driven into the ground to fix the bait station in place. Optionally, one or more extension sections 522 can be mounted to the simple main body 512. A removable cap 516 closes the top of the simple main body 512 or the top of an extension section 522 if extension sections are used. Inside the simple main body 512, and inside any extension section 522 that is optionally used, is placed at least one axially aligned bait unit 514, and, optionally, any of the other units disclosed above. This alternative simplified spiked embodiment 505 of the pest-control system and method can be used with the simple main body 512 pushed into the ground so that the simple main body is mostly buried. When buried in the ground, simple main body 512 provides a direct point of contact between the foraging pests and the bait station itself. Accordingly, the surface area of main body 512 is maximized to provide increased point-of-contact between the termites and the bait or attractant element 514 featured in the spiked embodiment 505. Alternatively, it can be used with the simple main body 512 pushed only so deep as to make tight contact with the ground, and possibly a slight indentation in the ground.

The simplified spiked embodiment 505 may feature the alternate-feature cap 416 depicted in detail in FIGS. 33 and 34, with the corresponding sensor array 801. The alternate-feature cap 416, with its sensor array 801, may provide for capabilities or features such as an upward-facing camera and/or light meter, a motion detector, a gas sensor, a thermometer, a thermos-imaging sensor, a microphone, a rain gauge, a hydrometer, a GPS system, and a USB port. The sensor array may preferably have data-storage, data-computation, and data-communication capabilities, such that the data captured by the sensor array 801 provides important information regarding the overall environment of the system to an analyst for data analysis. Appropriate analysis of the data captured by the sensor array 801 in the system featuring the spiked embodiment 505 of the pest control system may lead to alteration of the overall environment of the system, such as the alternation of the temperature, humidity, lighting, and so forth, in a manner that creates a more attractive environment for the termites, and may additionally lead to the appropriate replication of preferred conditions in subsequent applications of the spiked embodiments 505 in the pest control system.

Figure 47:
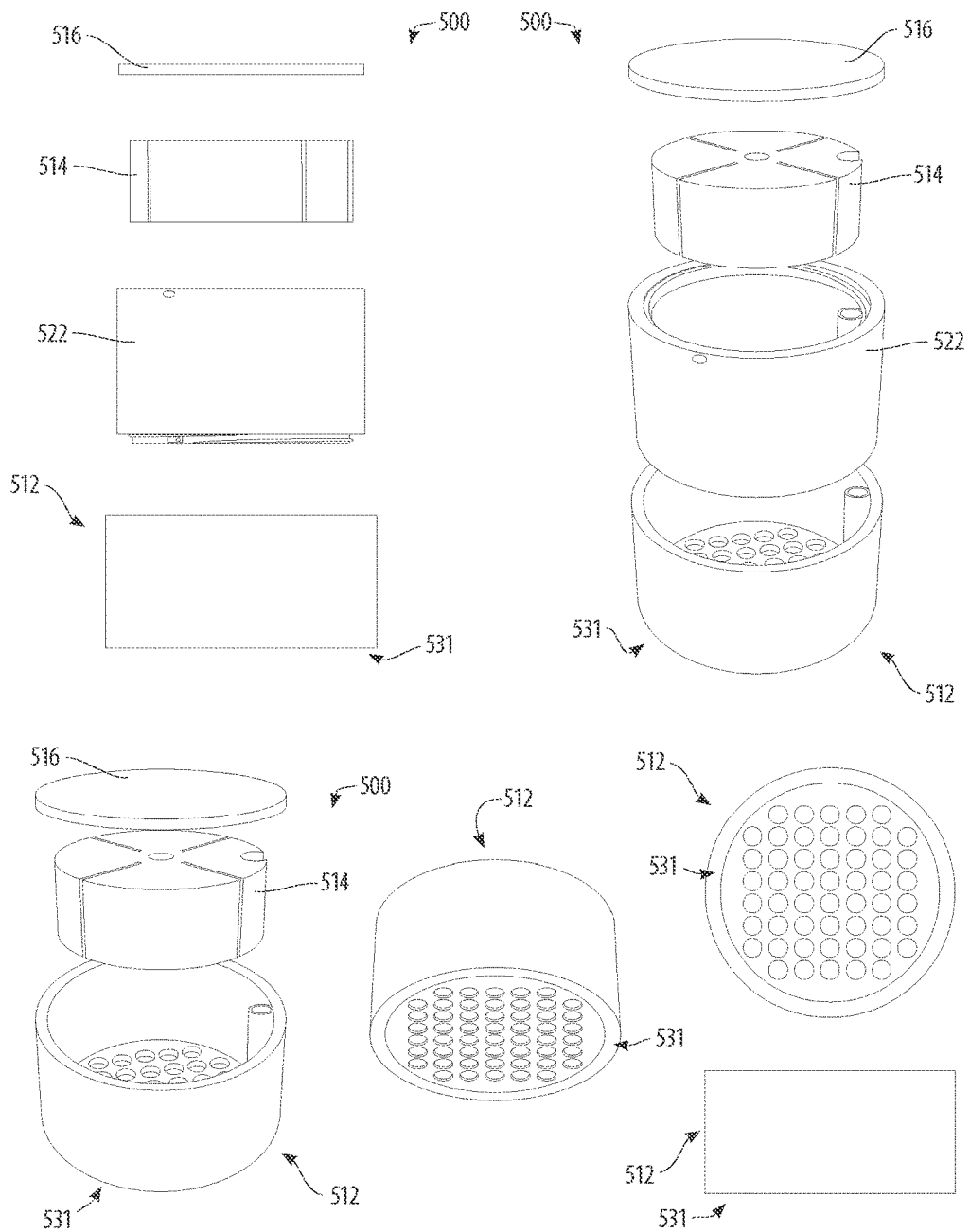
FIG. 47 illustrates a simplified flat-bottomed, weighted embodiment of the pest control system and method of the invention.

Referring to FIG. 47, an alternative simplified flat-bottomed embodiment 500 of the pest-control system and method provides a basic bait station having a simple main body 512 having a weighted bottom portion 531, which keeps the bait station fixed in place on the ground. It may be understood that the flat-bottomed embodiment 500 may feature a weighted element along the sides of the flat-bottomed embodiment 500, as is not required to feature the weight in the bottom portion 531 of the flat-bottomed embodiment 500. Additionally, one or more extension sections 522 can be mounted to the simple main body 512. A removable cap 516 closes the top of the simple main body 512 or the top of an extension section 522 if extension sections are used. Inside the simple main body 512, and inside any extension section 522 that is optionally used, is placed at least one axially aligned bait unit 514, and, optionally, any of the other units disclosed above. This alternative simplified flat-bottomed embodiment 500 of the pest-control system and method can be used with the simple main body 512 pushed into the ground so that the simple main body is mostly buried, can be used with the simple main body 512 pushed only so deep as to make tight contact with the ground and possibly a slight indentation in the ground, or can be used just placed on the surface of the ground if penetration of the ground surface is not possible or practical. Whatever placement of the simple main body 512 that is utilized, the simple main body 512 provides a direct point of contact between the foraging pests and the bait station itself. Accordingly, the surface area of main body 512 is maximized to provide increased point-of-contact between the termites and the bait or attractant element 514 featured in the flat-bottomed embodiment 500.

The simplified flat-bottomed, weighted embodiment 500 may feature the alternate-feature cap 416 depicted in detail in FIGS. 33 and 34, with the corresponding sensor array 801. The alternate-feature cap 416, with its sensor array 801, may provide for capabilities or features such as an upward-facing camera and/or light meter, a motion detector, a gas sensor, a thermometer, a thermos-imaging sensor, a microphone, a rain gauge, a hydrometer, a GPS system, and a USB port. The sensor array may preferably have data-storage, data-computation, and data-communication capabilities, such that the data captured by the sensor array 801 provides important information regarding the overall environment of the system to an analyst for data analysis. Appropriate analysis of the data captured by the sensor array 801 in the system featuring the flat-bottomed, weighted embodiment 500 of the pest control system may lead to alteration of the overall environment of the system, such as the alternation of the temperature, humidity, lighting, and so forth, in a manner that creates a more attractive environment for the termites, and may additionally lead to the appropriate replication of preferred conditions in subsequent applications of the flat-bottomed, weighted embodiments 500 in the pest control system.

Figure 48:
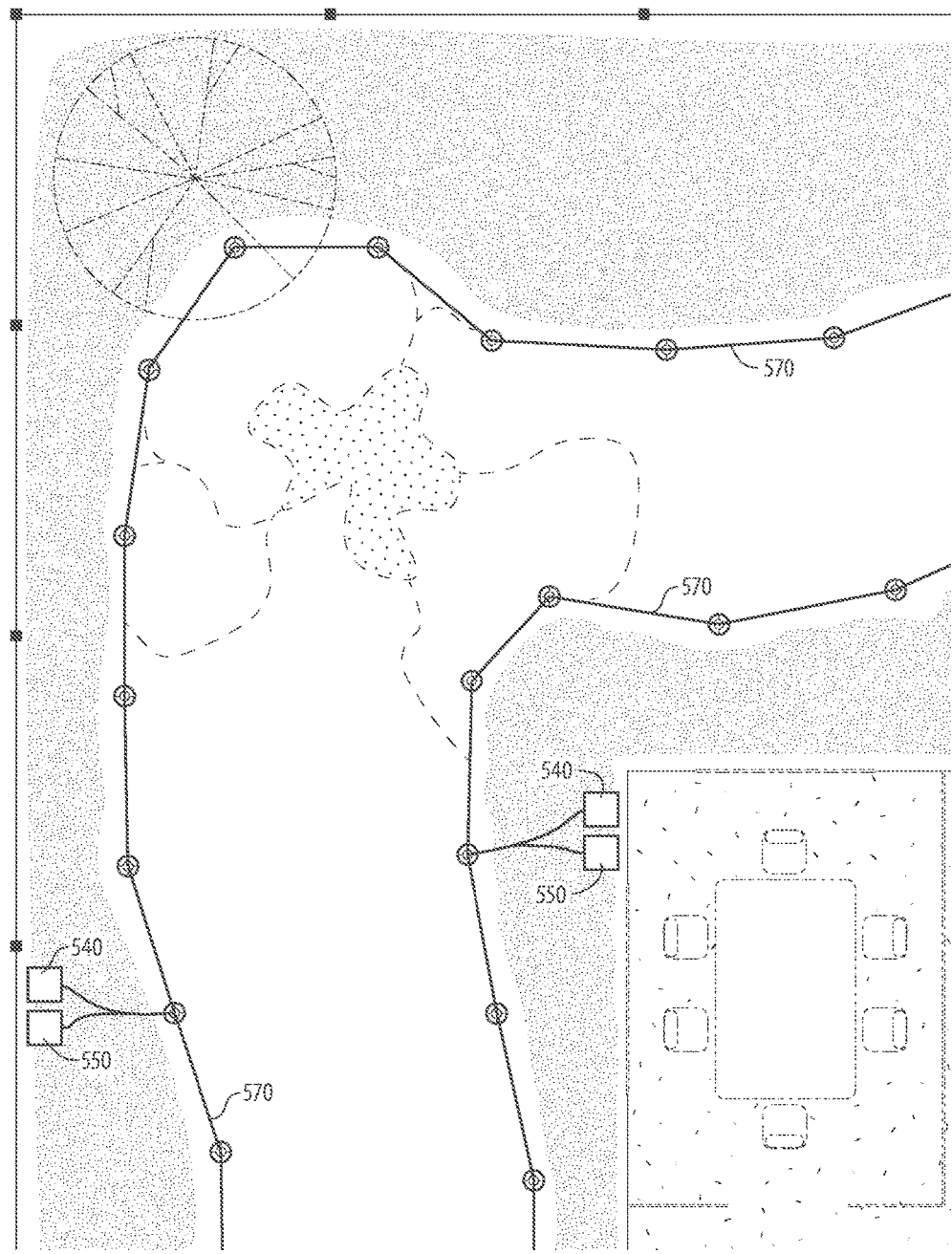
FIG. 48 illustrates an active border embodiment of the pest control system and method of the invention in use in a yard, such as a residential, industrial, or commercial environment.
Figure 49:
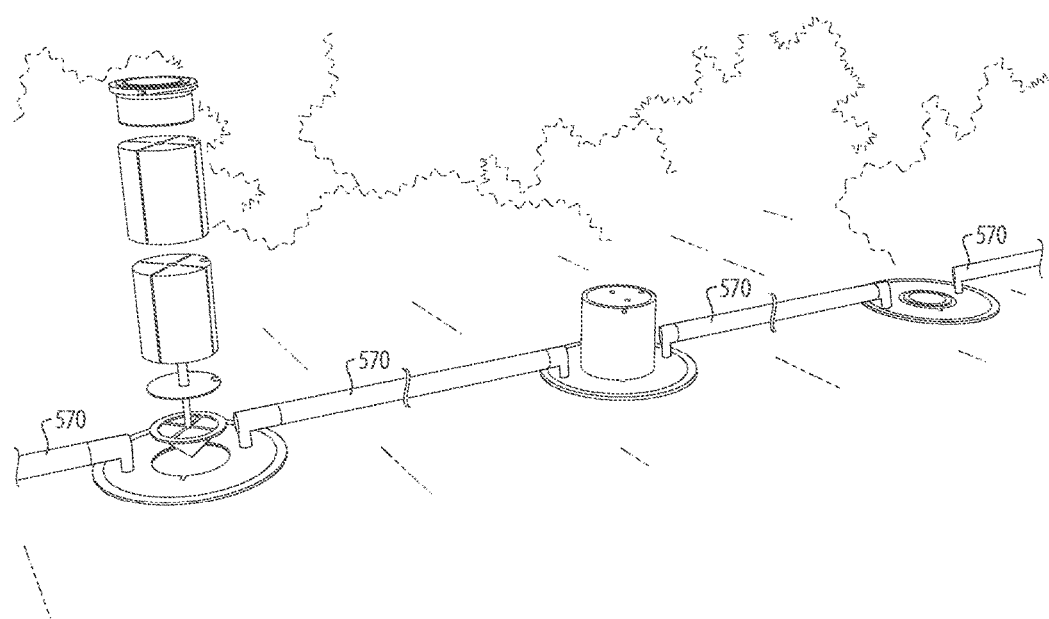
FIG. 49 illustrates an active border embodiment of the pest control system and method of the invention in use.

Referring to FIG. 48 & FIG. 49, an active-border embodiment of the pest-control system and method provides active-border sections 570 which function as either a substitute for or a complement to other types of low garden borders such as stones, bricks, wood, metal, or rubber or plastic borders. The active border sections 570 also function as conduits for implementing the "daisy chain" external hydration line 730 and the electrical cable 760 disclosed above, plus, optionally, additional data cables for gathering data from or transmitting data to the several bait stations. In this active-border embodiment, the bait stations are installed along the boundaries of features such as flower beds, gardens, shrubbery, hedges, and the like. The bait stations are connected together in a "daisy chain" fashion as disclosed above, but in this embodiment with active-border sections 570 having the water tube and any electrical or data cables enclosed within or otherwise incorporated into and protected by the active-border sections 570, which, as stated, also serve as a decorative and functional border treatment. The connection of the bait stations additionally serves to create a tunneling effect for the termites or foraging creatures, such that the physical line of the active-border sections guide the foraging insects to the appropriate bait station.

Additionally, the water tube may serve as an optional hydration line along the application of the "daisy chain" after installation. It is envisioned that because the "daisy chain" may be applied in, for instance, a commercial or residential yard or garden, the hydration line may have added functionality of providing irrigation to the environment. It may be understood that the advantages of the active-border system disclosed herein is not limited to use in a residence, but may be applied, without limitation, to an industrial environment, public setting, like a park, or commercial area.

The "daisy chain" or chains of an installation of this active-border embodiment have at least one active-border water source 540, corresponding to the external water source 720 disclosed above, and at least one active-border power source 550, corresponding to the external power source 740 and transformer 750 disclosed above. The external power source would need to provide low-voltage and safety systems comparable to existing low-voltage outdoor lighting systems.

The external power source serves a dual purpose within the system. First, it serves to provide electric power to the active-border sections 570, as noted above. Second, the electromagnetic current itself acts as an attractant to the termites and may draw more pests into the system. The electromagnetic current, when it functions as an attractant to the termites, additionally creates an appropriate tunneling effect as the current is applied, physically providing a tunnel for the termites to the appropriate bait station. Power from an external power source is passed through a transformer in order to bring it to a low voltage that would be appropriate for any electronic components, and is safely transmitted on the buried electrical cable, providing power to the active-border sections while at the same time creating a field of electromagnetic current detectable by insects.

The active-border sections 570 may additionally feature lighting along the "daisy chain" installation of the active-border embodiment. The lighting, like the power source 550, serves a dual purpose. The lighting first acts as an attractant to certain termites, which are attracted to lighting elements when the environment is otherwise dark or unlighted. Second, the lighting may provide an aesthetically pleasing element to the overall active-border embodiment, such that the active-border "daisy chain", with appropriate lighting along the chain, may be placed in any manner that the user wishes to light selected environment. With a set of lighting along the "daisy chain," the user may, for example, apply the "daisy chain" along the border of a garden, around the perimeter of a tree, or simply in a desired design to create a pleasing lighting effect in the environment.

The active-border sections 570, like the embodiments discussed in detail above, likewise may feature the alternate-feature cap 416 depicted in detail in FIGS. 33 and 34. The alternate-feature cap 416, with its sensor array 801, may provide for capabilities or features such as an upward-facing camera and/or light meter, a motion detector, a gas sensor, a thermometer, a thermos-imaging sensor, a microphone, a rain gauge, a hydrometer, a GPS system, and a USB port. The sensor array may preferably have data-storage, data-computation, and data-communication capabilities, such that the data captured by the sensor array 801 provides important information regarding the overall environment of the system to an analyst for data analysis. Appropriate analysis of the data captured by the sensor array 801 in the active-border sections 570 may lead to alteration of the overall environment of the system, such as the alternation of the temperature, humidity, lighting, and so forth, in a manner that creates a more attractive environment for the termites, and may additionally lead to the appropriate replication of preferred conditions in subsequent implementations of the active-border pest control system.

Many other changes and modifications can be made in the system and method of the present invention without departing from the spirit thereof. I therefore pray that my rights to the present invention be limited only by the scope of the appended claims.

We claim:

1. A pest control system for controlling cellulose-consuming pests in a pre-determined location, the pest control system comprising:
   (i) a plurality of bait stations, each bait station comprising:
      (a) a main body, having a nominal top and bottom face and cylindrical sides, defining an essentially cylindrical inner area, adapted to be placed with at least said bottom face in close contact on or beneath the ground surface;
      (b) a portway extending vertically along the side of the cylindrical inner area of said main body, adapted to allow continuing access to the lower portion of said main body, in use;
      (c) at least one cellulose-food module fitted in the inner area of said main body, and having a central essentially cylindrical void and a peripheral essentially cylindrical void; and
      (d) a locking top adapted to be removably attached to said main body at said top face;
   (ii) a plurality of active-border sections, each active-border section comprising:
      (a) an exterior surface adapted to serve as a decorative and functional garden border section; and
      (b) an interior section adapted to accommodate a tube for distribution of water; and
   (iii) at least one active-border water source adapted to supply water for distribution through said tubes of said active-border sections to said bait stations or peripheral environment of said bait stations;
where, in use, said bait stations are placed at intervals along boundaries of landscape features, said active-border sections connect a said bait station to another, creating a chain, such that water is supplied by said active-border water source and is distributed to all bait stations along the chain.

2. A pest control system for controlling cellulose-consuming pests in a pre-determined location, the pest control system comprising:
   (i) a plurality of bait stations, each bait station comprising:
      (a) a main body, having a nominal top and bottom face and cylindrical sides, defining an essentially cylindrical inner area, adapted to be placed with at least said bottom face in close contact on or beneath the ground surface;
(b) a portway extending vertically along the side of the cylindrical inner area of said main body, adapted to allow continuing access to the lower portion of said main body, in use;
(c) at least one cellulose-food module fitted in the inner area of said main body, and having a central essentially cylindrical void and a peripheral essentially cylindrical void; and
(d) a locking top adapted to be removably attached to said main body at said top face;
(ii) a plurality of active-border sections, each active-border section comprising:
(a) an exterior surface adapted to serve as a decorative and functional garden border section; and
(b) an interior section adapted to accommodate a cable for distribution of low-voltage power; and
(iii) at least one active-border power source adapted to supply power for distribution through said cables of said active-border sections to said bait stations or peripheral environment of said bait stations;
where, in use, said bait stations are placed at intervals along boundaries of landscape features, said active-border sections connect a said bait station to another, creating a chain, such that power is supplied by said active-border power source and is distributed to all bait stations along the chain.

3. The pest control system of claim 1, where each said active-border section further comprises:
(c) an interior section adapted to accommodate a cable for distribution of low-voltage power; and
(d) at least one active-border power source adapted to supply power for distribution through said cables of said active-border sections to said bait stations; and
where, in use, power is supplied by said active-border power source and is distributed to all bait stations along the chain.

4. The pest control system of claim 1, further comprising at least one extension section adapted to removable locking placement between said main body and said locking top, adapted to continue and extend the essentially cylindrical inner area of said main body.

5. The pest control system of claim 2, further comprising at least one extension section adapted to removable locking placement between said main body and said locking top, adapted to continue and extend the essentially cylindrical inner area of said main body.

6. The pest control system of claim 1, where each bait station further comprises a simple main body having a weighted portion, adapted to be placed substantially at the ground surface.

7. The pest control system of claim 2, where each bait station further comprises a simple main body having a weighted portion, adapted to be placed substantially at the ground surface.

8. The pest control system of claim 1, where each bait station further comprises a simple main body having an anchoring spike, adapted to be driven into the ground.

9. The pest control system of claim 2, where each bait station further comprises a simple main body having an anchoring spike, adapted to be driven into the ground.

10. The pest control system of claim 2, where said locking top further comprises a sensor array adapted to capture, store, and transmit data.

11. A pest control method for controlling cellulose-consuming pests in a pre-determined location, the pest control method comprising:
(i) providing a pest control system, comprising:
(a) a plurality of bait stations, each bait station comprising:
(1) a main body, having a nominal top and bottom face and cylindrical sides, defining an essentially cylindrical inner area, adapted to be placed with at least said bottom face in close contact on or beneath the ground surface;
(2) a portway extending vertically along the side of the cylindrical inner area of said main body, adapted to allow continuing access to the lower portion of said main body, in use;
(3) at least one cellulose-food module fitted in the inner area of said main body, and having a central essentially cylindrical void and a peripheral essentially cylindrical void; and
(4) a locking top adapted to be removably attached to said main body at said top face;
(b) a plurality of active-border sections, each active-border section comprising:
(1) an exterior surface adapted to serve as a decorative and functional garden border section; and
(2) an interior section adapted to accommodate a tube for distribution of water; and
(c) at least one active-border water source adapted to supply water for distribution through said tubes of said active-border sections to said bait stations or peripheral environment of said bait stations;
(ii) placing said bait stations at intervals along boundaries of landscape features; and
(iii) connecting said bait stations one to another using active-border sections, creating a chain, such that water is supplied by said active-border water source and is distributed to all bait stations along the chain.

12. A pest control method for controlling cellulose-consuming pests in a pre-determined location, the pest control method comprising:
(i) providing a pest control system, comprising:
(a) a plurality of bait stations, each bait station comprising:
(1) a main body, having a nominal top and bottom face and cylindrical sides, defining an essentially cylindrical inner area, adapted to be placed with at least said bottom face in close contact on or beneath the ground surface;
(2) a portway extending vertically along the side of the cylindrical inner area of said main body, adapted to allow continuing access to the lower portion of said main body, in use;
(3) at least one cellulose-food module fitted in the inner area of said main body, and having a central essentially cylindrical void and a peripheral essentially cylindrical void; and
(4) a locking top adapted to be removably attached to said main body at said top face;
(b) a plurality of active-border sections, each active-border section comprising:
(1) an exterior surface adapted to serve as a decorative and functional garden border section; and
(2) an interior section adapted to accommodate a cable for distribution of low-voltage power; and
(c) at least one active-border power source adapted to supply power for distribution through said cables of said active-border sections to said bait stations or peripheral environment of said bait stations;

(ii) placing said bait stations at intervals along boundaries of landscape features; and (iii) connecting said bait stations one to another using said active-border sections, creating a chain, such that water is supplied by said active-border water source and is distributed to all bait stations along the chain.

13. The pest control method of claim 11, where each said active-border section further comprises:

(3) an interior section adapted to accommodate a cable for distribution of low-voltage power; and (4) at least one active-border power source adapted to supply power for distribution through said cables of said active-border sections to said bait stations; and where, in use, power is supplied by said active-border power source and is distributed to bait stations along the chain.

14. The pest control method of claim 11, where said pest control system further comprises at least one extension section adapted to removable locking placement between said main body and said locking top, adapted to continue and extend the essentially cylindrical inner area of said main body.

15. The pest control method of claim 12, where said pest control system further comprises at least one extension section adapted to removable locking placement between said main body and said locking top, adapted to continue and extend the essentially cylindrical inner area of said main body.

16. The pest control method of claim 11, where each bait station further comprises a simple main body having a weighted portion, adapted to be placed substantially at the ground surface.

17. The pest control method of claim 12, where each bait station further comprises a simple main body having a weighted portion, adapted to be placed substantially at the ground surface.

18. The pest control method of claim 11, where each bait station further comprises a simple main body having an anchoring spike, adapted to be driven into the ground.

19. The pest control method of claim 12, where each bait station further comprises a simple main body having an anchoring spike, adapted to be driven into the ground.

20. The pest control method of claim 12, where said locking top further comprises a sensor array adapted to capture, store, and transmit data.

* * * * *